(12) United States Patent
Santoro et al.

(10) Patent No.: US 7,376,907 B2
(45) Date of Patent: *May 20, 2008

(54) SYSTEM AND METHOD FOR SIMULTANEOUS DISPLAY OF MULTIPLE INFORMATION SOURCES

(75) Inventors: Ovid Santoro, Northport, ME (US); Klaus Lagermann, Copenhagen (DK); Tom Dechaene, Tervuren (BE)

(73) Assignee: SurfCast, Inc., Lincolnville, ME (US)

( * ) Notice: Subject to any disclaimer, the term of this patent is extended or adjusted under 35 U.S.C. 154(b) by 290 days.

This patent is subject to a terminal disclaimer.

(21) Appl. No.: 11/140,546

(22) Filed: May 27, 2005

(65) Prior Publication Data

US 2005/0283734 A1 Dec. 22, 2005

Related U.S. Application Data

(63) Continuation of application No. 10/136,873, filed on Apr. 30, 2002, now Pat. No. 7,028,264, which is a continuation-in-part of application No. 09/702,325, filed on Oct. 30, 2000, now Pat. No. 6,724,403.

(60) Provisional application No. 60/162,522, filed on Oct. 29, 1999.

(51) Int. Cl.
 *G06F 15/00* (2006.01)
 *G06F 13/00* (2006.01)

(52) U.S. Cl. ........................ 715/765; 715/729

(58) Field of Classification Search ........ 715/764–790, 715/716–729, 840
See application file for complete search history.

(56) References Cited

U.S. PATENT DOCUMENTS

| 4,555,775 | A | 11/1985 | Pike |
|---|---|---|---|
| 4,653,020 | A | 3/1987 | Cheselka et al. |
| 4,712,191 | A | 12/1987 | Penna |
| 5,157,384 | A | 10/1992 | Greanias et al. |
| 5,394,521 | A | 2/1995 | Henderson, Jr. et al. |
| 5,479,602 | A | 12/1995 | Baecker et al. |
| 5,740,430 | A | 4/1998 | Rosenberg et al. |
| 5,740,549 | A | 4/1998 | Reilly et al. |
| 5,778,181 | A | 7/1998 | Hidary et al. |
| 5,793,368 | A | 8/1998 | Beer |

(Continued)

OTHER PUBLICATIONS

Available Web Site: www.dodots.com Accessed on: May 9, 2001.

(Continued)

*Primary Examiner*—Cao(Kevin) Nguyen
(74) *Attorney, Agent, or Firm*—Fish & Richardson P.C.

(57) ABSTRACT

A computerized method of presenting information from a variety of sources on a display device. Specifically the present invention describes a graphical user interface for organizing the simultaneous display of information from a multitude of information sources. In particular, the present invention comprises a graphical user interface which organizes content from a variety of information sources into a grid of tiles, each of which can refresh its content independently of the others. The grid functionality manages the refresh rates of the multiple information sources. According to one embodiment, the method of the present invention allocates refresh rates to tiles according to priorities that are assigned based on identifiers such as quality of service (QoS) tags associated with one or more of the information sources. The present invention is intended to operate in a platform independent manner.

6 Claims, 27 Drawing Sheets

U.S. PATENT DOCUMENTS

| | | | |
|---|---|---|---|
| 5,813,007 A | | 9/1998 | Nielsen |
| 5,848,352 A | | 12/1998 | Dougherty et al. |
| 5,905,492 A | * | 5/1999 | Straub et al. ............... 715/744 |
| 5,918,237 A | | 6/1999 | Montalbano |
| 6,003,041 A | | 12/1999 | Wugofski |
| 6,011,537 A | | 1/2000 | Slotznick |
| 6,025,837 A | * | 2/2000 | Matthews et al. ........... 715/721 |
| 6,028,602 A | | 2/2000 | Weidenfeller et al. |

OTHER PUBLICATIONS

Available Web Site: www.snippets.com Accessed on May 9, 2001.
Available Web Site: www.ububu.com Accessed on May 9, 2001.
Available Web Site: www.chatb.com Accessed on Nov. 7, 2000.
Duplex Multiplex, Sensormatic, Samsung,. . .ireless communications, hand helds, maxon Available Web Site: www.mindspring.com/~stancom/multi.html Accessed on May 9, 2001.
push technology. Available Web Site: www.whatis.com/Whatis_Definition_Page/0,4152,213345,00.html Last Update: Jul. 27, 2000 Accessed on Nov. 7, 2000.
Clyman, John. Web Integration/Internet Explorer 4.0 Available Web Site: www.zdnet.com/pcmag/features/memphis/memphis1.htm Accessed on Nov. 7, 2000.

Oct. 2000, Product Spotlight: Non-browser based portal solution from Snippets Software, Inc., *Corporate Portals Letter* [Online] 1(10), 1-3. Available Web Site: www.snippets.com/download/Corporate_Portal_Article.pdf Accessed on Oct. 21, 2002.
White Paper, The need for Qos: The Internet protocol's "best-effort" service has worked well so far, so why do we need to change it? Available Web Site: http://www-sop.inria.fr/rodeo/rserban/Files/Need_for_QoS-v4.pdf Accessed on Nov. 7, 2000.
IP Quality of Service: An Overview Available Web Site: http://www.ittc.ukans.edu/~rsarav/ipqos/ip_qos.htm Accessed on Oct. 21, 2002.
Cisco Quality of Service, "Fact Sheet Quality of Service Fact Sheet" Available Web Site: http://www.cisco.com/warp/public/cc/so/neso/vvda/avvid/eeqos_ds.htm Accessed on Oct. 21, 2002.
Loyall et al., "Specifying and Measuring Quality of Service in Distributed Object Systems", *IEEE*, Published in the Proceedings of ISORC'98, Apr. 20-22, 1998 in Kyoto, Japan. Available Web Site: http://www.dist-systems.bbn.com/papers/1998/ISORC/isorcweb.html Accessed on Oct. 21, 2002.

\* cited by examiner

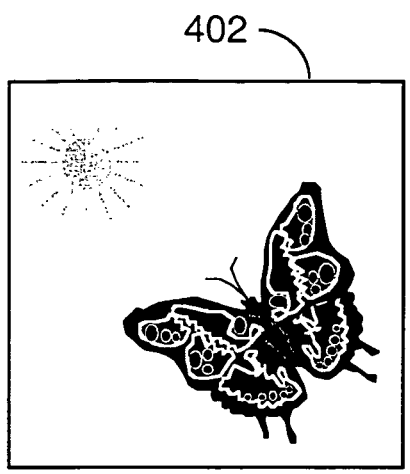
402
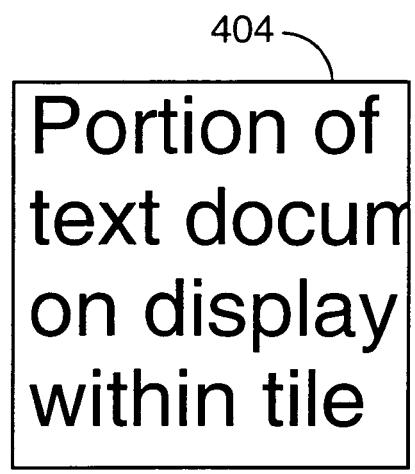
404
Portion of text docum on display within tile
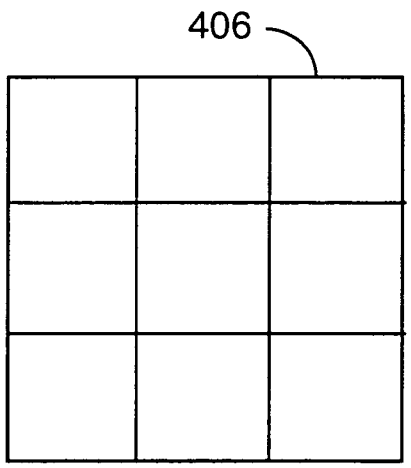
406
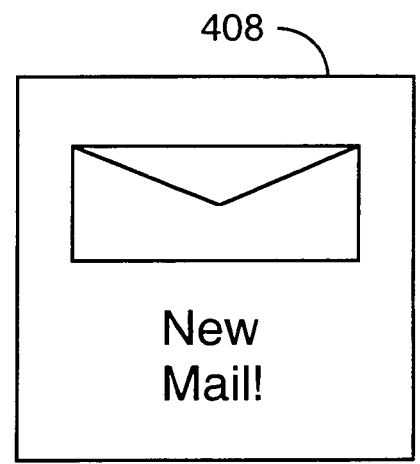
408
New Mail!
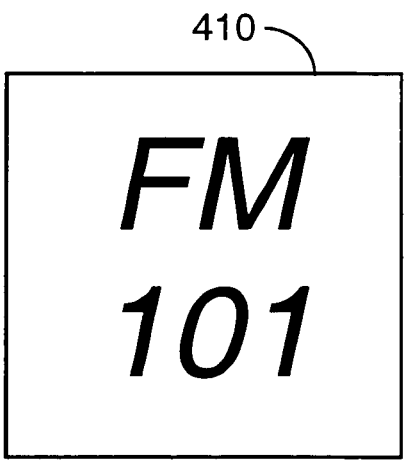
410
FM 101
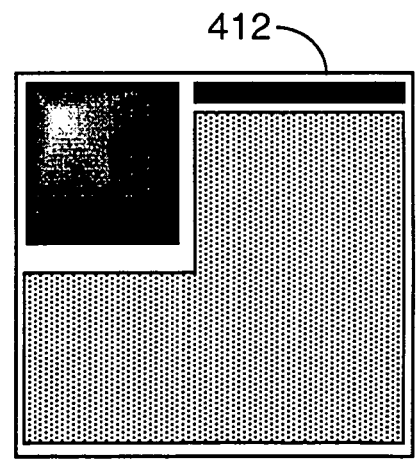
412
Fig. 4

```
<TD><A HREF="tile2_target.htm"
    TARGET="new"
    ONMOUSEOVER=action1(arg3)
    ONMOUSEOUT=action2(arg4)
    REFRESH=timeout(500)
    SOURCE=http://www.camelot.castle/swords/excalibur.til
    CLICKMAP=    { 0, 0,50,50, clickfunction1( clickargument1),
                  51, 0,50,50, clickfunction2( clickargument2),
                  0,51,50,10, clickfunction3( clickargument3) }
    TOOLBAR={"local/toolbars/radio.too" PLACEMENT="bottom" }
    ALARM="alarms/condition_rain=TRUE, condition_weekend=FALSE,
          alarmaction=blow_the_horn">

```
<HTML>
<HEAD>
<TITLE>Surfcast Grid Example</TITLE>
<META NAME= "Resource Manager"CONTENT= "RESMGR.EXE">
<META NAME= "Author" CONTENT= "Surfcast, Inc.">
</HEAD>
...
<BODY BACKGROUND= "surfback.gif">
<TABLE>
<TR>
<TD><A HREF= "http://www.somewhere.com/sometarget.html"
    TARGET= "new"
    ONMOUSEOVER=action1(arg1)
    ONMOUSEOUT=action2(arg2)
    REFRESH=timeout(200)
    SOURCE= "http://www.surfcast.com/tilelibrary/tile2.til">
</TD>

<TD><A HREF= "http://www.somewhereelse.com/someothertarget.html"
    TARGET= "new"
    ONMOUSEOVER=action3(arg3)
    ONMOUSEOUT=action4(arg4)
    REFRESH=timeout(500)
    SOURCE= "http://www.camelot.castle/swords/excalibur.til">
</TD>

<TD><A HREF= "local/document.htm"
    TARGET= "new"
    ONMOUSEOVER=action1(arg3)
    ONMOUSEOUT=action2(arg4)
    REFRESH=timeout(0)
    SOURCE= "local/documents/somedocument.til">
</TD>

</TR>

</TABLE>
</BODY>
</HTML>
```

Fig. 13

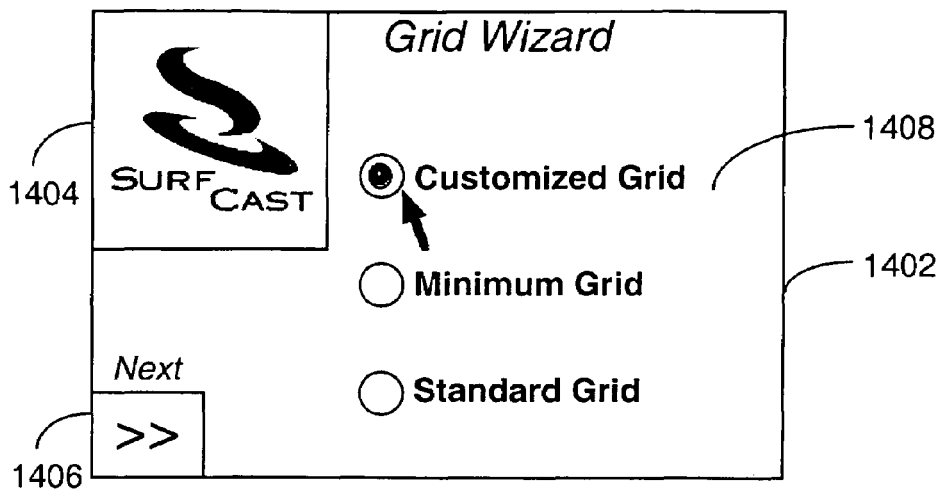
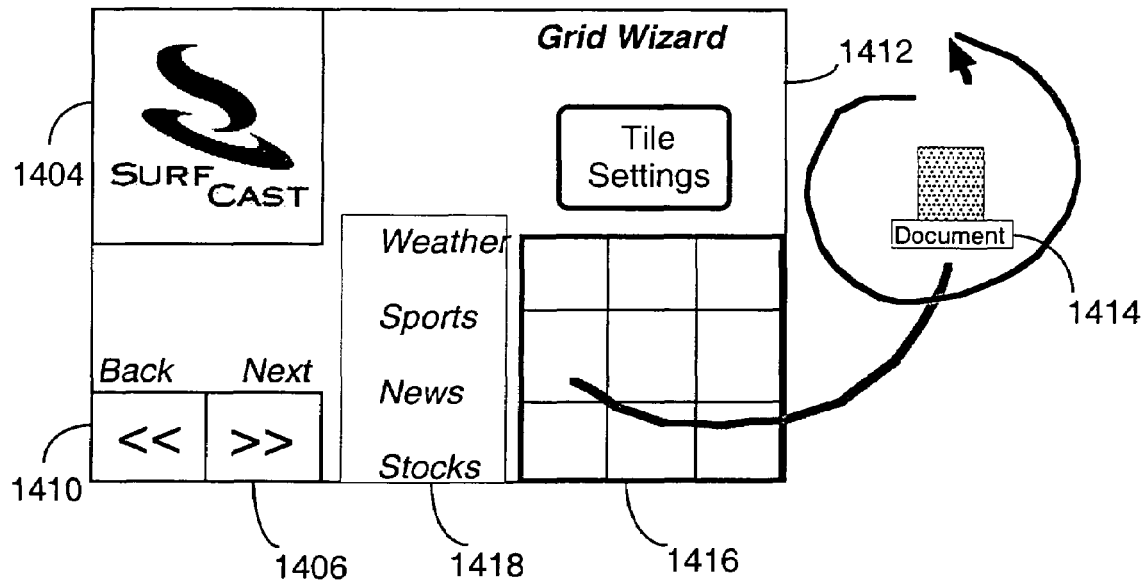
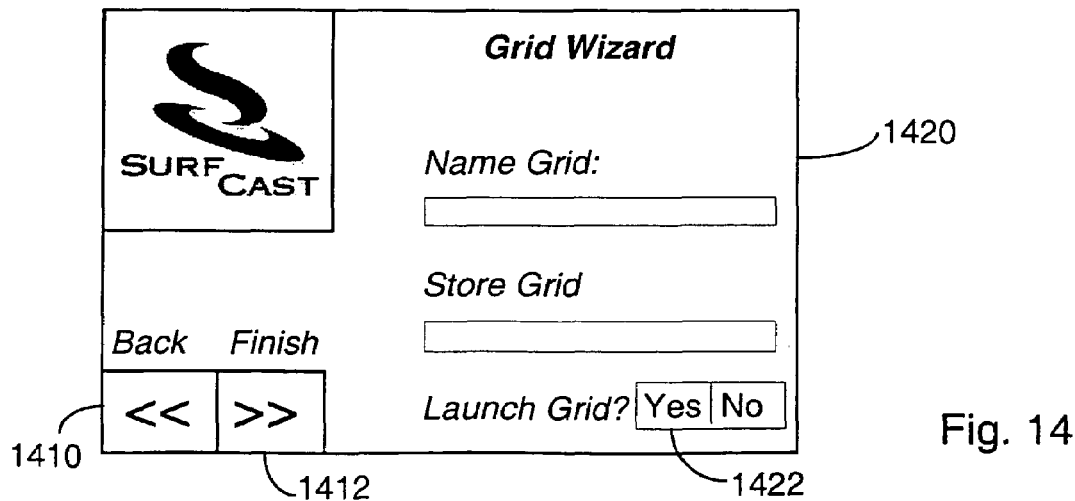
Fig. 14

SYSTEM AND METHOD FOR SIMULTANEOUS DISPLAY OF MULTIPLE INFORMATION SOURCES

CROSS-REFERENCE TO RELATED APPLICATIONS

This application is a continuation of U.S. Ser. No. 10/136,873, filed Apr. 30, 2002 now U.S. Pat. No. 7,028,264, which is a continuation-in-part of U.S. application Ser. No. 09/702,325, filed Oct. 30, 2000 now U.S. Pat. No. 6,724,403, which claims the benefit of U.S. Provisional Application Ser. No. 60/162,522, Filed Oct. 29, 1999.

FIELD OF THE INVENTION

The present invention relates to methods of presenting information from a variety of sources on a display device. Specifically the present invention describes a graphical user interface for organizing simultaneous display of information from a multitude of sources.

BACKGROUND OF THE INVENTION

The scope of the global communications capacity, comprising fixed link and wireless networks, continues to expand rapidly. The variety and complexity of communication devices proliferates and the number of users escalates. As a result, users are faced with increasingly complex systems and interfaces with which to manage multiple sources of information. At the same time, society has increased its demands on time and productivity so that users no longer have the luxury of focusing their attention on a single source of information or means of communication. Instead, the norm today is for people to carry out many tasks simultaneously.

As might be expected, these demands have exposed substantial problems in current communications technology. In particular, users are faced with insufficient resources to manage and access the volume and variety of information available to them in an efficient and productive manner. While a variety of tools designed to assist in accessing and managing these resources have been created, these tools remain unsatisfactory. Consequently, users are impeded by the myriad of information sources, each with its own method of use and often with its own login and password requirements, as well as by slow retrieval times to access the information. The result is an unacceptable delay for many operations.

Under the present art, for example, it is usually the case that a user lacks the bandwidth resources to receive multiple video signals simultaneously. If an individual were receiving one video signal, it is usually impractical to receive a second at the same time due to bandwidth constraints. Thus, the user could not, for example, monitor multiple video data streams of sporting or news events; instead, the user could monitor only one video data stream at a time.

To address such bandwidth resource limitations, the current art only accesses information when the user requests it. As a result, there is an inevitable delay between the user's request for information and the communications device's presentation of it. For example, if a user wants to monitor sources of news information on the Internet using current browser technology, the user must continuously and manually request the news data from its source to determine whether the data has been updated. Prior to requesting and subsequently receiving the data, the user has no way of knowing whether the data has been updated. In any case, the user is unlikely to want to refresh the status of each application by manual intervention himself at the frequency necessary to ensure that the information is up to date. Additionally, if a user wishes to view two or more webpages simultaneously, he must run two or more copies of the web-browser program. The act of manually refreshing the content of alternate programs in order to ascertain which have any new material to offer is fundamentally inefficient.

Similarly, the user's access to such data is not in real-time or even near real-time because each time the user wants to view the information, he must request it from its source and wait for the source to transmit it to him. Thereafter, he must wait until his communications device has received and processed the information before it is presented. For complex information such as a video signal, this can take longer than a minute to occur; and, even for simple information, this process can take many seconds. Thus, the user is denied real-time or near real-time access to the information.

Present technology that locally stores or "caches" previously accessed information to make it available to the user more rapidly does not solve this problem, because the cached information is necessarily old. The user's communications device must still verify the accuracy of the information with the source before the system displays the cached information. As a result, the user is denied real-time or near real-time access to updated information.

Similarly, if a user wishes to make two or more simultaneous downloads there is no control over the relative rates at which the respective downloads would occur. So-called "push technologies" attempt to address this problem by organizing information from a number of related sources and sending it periodically to a user. While this arrangement frees a user from actively participating in the download, the price is that the user has little control over the organization of the information and can only practically handle a small number of such transmissions at any one time. Each transmission is subject to the bandwidth available.

Of course, not all tasks require the same allocation of resources and, correspondingly, not all tasks have equal priorities for a given user. In particular, a user may wish to customize the information environment in such a way that many processes are occurring synchronously, yet each is communicating with the user at a rate that is acceptable. For example, a television viewer may wish to know what is being broadcast on several channels at the same time but only care to watch one of them closely. An Internet user may wish to be continually in touch with sources of data from audio, video, chat-room, video-conferencing and e-mail checker utilities, but not wish all of them to update at the same frequency; the user would be satisfied merely to see at a glance a recent status of each. Some of these processes, such as chat-room activities entail very little data transmission and can, indeed, be effectively updated on a continuous basis, whereas others require a great deal of bandwidth but could usefully be sampled at a lower rate. The current art lacks any technology for controlling the respective refresh rates of several simultaneous information sources. Furthermore, the current art lacks technology that can automatically design an appropriate refresh rate based on the type of data that is received.

At the same time that users are limited by system resources, they are also finding that they have no effective way of managing the multiplicity of available data types and information sources. It is difficult both to conduct two or more different types of computing activities at the same time or to monitor two or more different information sources simultaneously because the tools available are confusing, inflexible, and/or otherwise difficult to implement. Users require immediate access to a wide variety of up to date content presented in a flexible, easily customized interface.

In addition to restrictions in the capacity of today's networks, there is very little conformity amongst the information content. A typical communication device, such as a personal computer, television or mobile telephone, comprises a display unit connected to a processing unit that can accept information from many different sources. As described above, the signals, data and/or datastreams that are available to such a device are diverse, including, for example, HTML content, e-mail, or streaming audio and video. Correspondingly, the software tools that interpret and process the different information sources present each in a different way to the user. From a user's perspective, distinctions between the different types of information could usefully be removed so that each is viewed in a similar way and such that the current presentation associated with any information source gives an immediate indication of its current content. The present reality is different, however. The user must contend with a wide range of icons and program windows that may occupy space on a user's display screen. Another lack of conformity is the different mode of behavior for programs that address different types of information. An effort to standardize the ways in which different types of information are presented to the user would be advantageous. Equally, unification of the way in which those types of information are managed would save time and increase user productivity, for productivity is reduced when users must cope with different attributes of different programs and learn distinct paradigms for different types of information.

The nature of the application program windows and their respective icons predominantly found on today's computer displays is restrictive. The application window typically displays the current content or output of only a single program and program icons convey nothing of the program's current state or content. Often, an icon is a static image which is merely characteristic of the program or data represented thereby rather than the program's current state or its information content. In the present art, there is no intermediate between a window or an icon.

Thus, while a window may be resized as appropriate, it will frequently occupy the full display area, effectively limiting the user to a view of a single program. It may have active areas around its borders such as menu bars, scroll bars, or tool bars designed to allow the user to control aspects of the window's appearance or to set parameters specific to the operation of the program controlling it. Icons, in contrast, offer ease of display when multiple programs are active, but they do not permit viewing or control of the underlying program or data represented thereby. Instead, icons require user intervention, typically in the form of a mouse-click on an icon of interest, to view or control the program or information. Consequently, the user's viewing options are limited to a choice between one presenting very limited information about a multitude of programs and information and one presenting full information, but of only a single program or data source.

The fact that the GUI's of the present art are largely restricted to icons and windows diminishes the capacity to organize, manage, and access available information. With the Internet representing an ever expanding view of currently accessible global information, the need for flexible information management tools has become crucial. Similarly, with the current expansion of television programming available, for example, through cable television and satellite broadcasting, the need to manage this audiovisual content becomes acute. The convergence of television programming and computers increases these management needs all the more.

Current computer operating system software utilizes bookmarking schemes for managing Internet locations and complex database technologies for managing specialist information. Neither provides visual immediacy or ease of layout. Bookmark hierarchies are presented as cascading textual menus and database technologies arrange information into rigidly defined structures. The missing capability is a visual categorization in which an area of the display unit itself becomes the bookmark and the arrangement on the display becomes the categorization, independent of the type of content.

While the most common way of accessing information sources is via a personal computer, present day technology exists to communicate via a television or set-top box, handheld computing device, mobile and cellular telephones, all manner of "hybrid" devices such as an internet-accessible games player, or even in-car navigation and security systems, in which case Internet content and other data can be displayed as some portion of the screen. There is a growing convergence of technologies: televisions are beginning to find application as viewers of non-television data, (for example through use of "Vertical Blanking Interval" technology in which a signal is inserted into the main video signal or through set-top boxes providing limited computer and communications functionality); computers are already finding application for the display of movies, real-time data streams, and the playing of audio data; handheld computing devices and mobile telephones are also being enabled to access the Internet and other information sources; and other devices are becoming able to access a variety of signals, e.g., digital signals from satellites such as digital radio broadcasts.

To summarize the current state of the art, display technologies currently lack an interface which is capable of organizing any type of information, and presenting such information to the user in a consistent manner, in such a way that all currently open channels are able to indicate their activity on a continual basis, and which could run on any device. Furthermore the current art is deficient in respect of organizing multiple sources of information in a relevant manner that takes into account relationships between the various sources.

SUMMARY OF THE INVENTION

Accordingly, the present invention provides an easy to use graphical interface that facilitates the organization and management of multiple data sources corresponding to a user's needs and interests. The present invention comprises a grid of tiles that resides on the user's computer desktop. The grid of tiles provides a uniform, graphical environment in which a user can access, operate, and/or control multiple data sources on electronic devices. Additionally, the invention provides for automatic control of the refresh rates of multiple data sources, based on the character of the data or on "quality of service tags" that accompany the data. Such automatic control may operate in conjunction with one or more user preferences for the refresh rates of certain data. The graphical environment is uniform with respect to the source of accessed information and can manage multiple streams of content, entirely of the user's choice. For example, the invention presents video clips, e-mail messages, television shows, Internet sites, application programs, data files and folders, live video streams, music, radio shows, and any other form of analog signal, digital data or electronically stored information, to the user uniformly and simultaneously, regardless of whether the information is stored locally or available via modem, T1 line, infrared, or any other form of communication. The user's impression of the interface is also independent of the type of electronic device upon which it is implemented.

The present invention comprises a method executed by a computer under the control of a program stored in computer memory, said method comprising the steps of: partitioning a visual display of a computer into an array of tiles in a non-overlapping configuration; assigning a first refresh rate to a first tile of said array of tiles and a second refresh rate to a second tile of said array of tiles; updating information presented to said first tile in accordance with said first refresh rate; and updating information presented to said second tile in accordance with said second refresh rate. The manner of assigning the first and second refresh rates may depend upon the type of information received by each tile, including but not limited to the information content or an identifier contained in, or associated with, the information.

The present invention additionally includes an electronic readable memory to direct an electronic device to function in a specified manner, comprising: a first set of instructions to control simultaneous communication with a plurality of datastreams: a second set of instructions to partition a display into an array of tiles; a third set of instructions to associate a first datastream of said plurality of datastreams with a first tile of said array of tiles and a second datastream of said plurality of datastreams with a second tile of said array of tiles; a fourth set of instructions to retrieve data from said first datastream in accordance with a first retrieval rate and retrieve data from said second datastream in accordance with a second retrieval rate; and a fifth set of instructions to present data to said first tile in accordance with said first retrieval rate and present data to said second tile in accordance with said second retrieval rate. The first and second retrieval rates may be automatically assigned by the fourth and fifth set of instructions respectively, based upon the type of datastream or an identifier that accompanies each datastream, with or without the additional use of one or more user-specified retrieval rates.

The present invention additionally includes a system for facilitating the organization and management of multiple data sources, comprising: a device that includes a processor configured to execute instructions, a memory connected to the processor to store at least one program that includes a graphical user interface, and an input device that includes a display, wherein the processor executes instructions to: control simultaneous communication with a plurality of information sources; partition the display into an array of tiles; associate a first information source of the plurality of information sources with a first tile of the array of tiles and a second information source of the plurality of information sources with a second tile of the array of tiles, such that information from the first information source is displayed on the first tile and information from the second information source is displayed on the second tile, wherein information from at least one of the first source and the second source contains an identifier; retrieve information from the first information source in accordance with a first retrieval rate and retrieve information from the second information source in accordance with a second retrieval rate wherein the first and second retrieval rates are allocated based upon the identifier; and present information to the first tile in accordance with the first retrieval rate and present information to the second tile in accordance with the second retrieval rate.

The application program of the present invention runs on many different devices, including, but not limited to set-top box, personal computer and hand-held device. The grid and tiles retain the same characteristics, regardless of operating device. For example, the tiles remain individually configurable and can offer near real-time views of their data content. The application therefore permits the user's interaction with a range of electronic devices to be unified.

Additionally it is to be understood that the application program or programs of the present invention may be distributed between a client device and a server in such a way that certain data storage and intensive functions are carried out on a server.

BRIEF DESCRIPTION OF THE DRAWINGS

Additional objects and features of the invention will be more readily apparent from the following detailed description and appended claims when taken in conjunction with the drawings, in which:

FIG. 4 shows several tiles as might be found in a typical embodiment of the present invention.

FIG. 6 shows one embodiment of a tile in markup language.

FIG. 13 shows one embodiment of a grid in markup language.

FIG. 14 shows a sequence of windows that demonstrate how a grid might be set up for initial use by a "wizard" tool in one embodiment of the present invention.

DETAILED DESCRIPTION OF THE PREFERRED EMBODIMENTS

Figure 1:
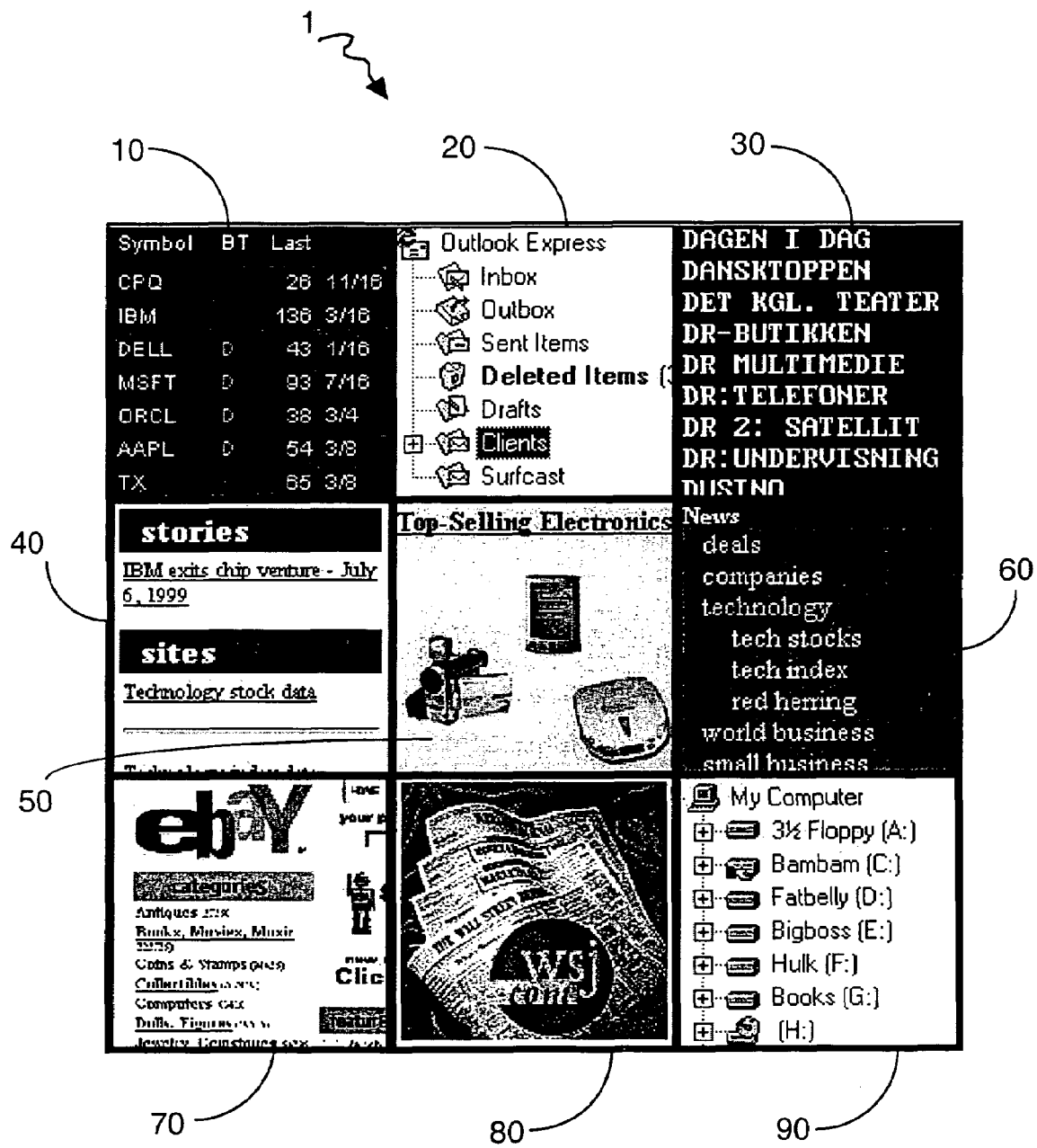
FIG. 1 shows a representative embodiment of the user interface of the present invention comprising a grid of tiles as might be depicted on a display screen.

FIG. 1 shows an illustrative configuration of the graphical user interface of the present invention. A grid 1 consisting of a 3 by 3 matrix of nine tiles demonstrates some of the different contents that tiles can display. Tile 10 points to a database of stock quotes. Tile 20 displays the active folders in an electronic mail utility. Tile 30 displays a portion of an alphabetical list of quoted companies. Tiles 40, 50, 60, 70 and 80 point to websites displaying, respectively, high technology news, electronic goods for sale, categories of business news, items available by auction and the Wall Street Journal. Tile 90 points to the file-viewer of a windows-based operating system, such as Microsoft Windows™, and displays the currently accessible disc drives.

Within the scope of the present invention, an information source may comprise any analog signal, source of digital data or a datastream, including, but not limited to, video, audio, text and graphics. The information may be in any format, including but not limited to ASCII, bitmap, MP3, JPEG, GIF, TIFF, a mark-up language such as HTNML, XML, VRML, HDML, formatted text such as rich text format, or binary. Preferably the software of the present invention is able to recognize the type or format of the information source and assign properties to tiles according to the type. In another preferred embodiment, the information source contains or is accompanied by an identifier that indicates a priority to be attached to the information when displayed by the graphical user interface. Such an identifier may be referred to as a "quality of service", (QoS) tag.

Figure 2:
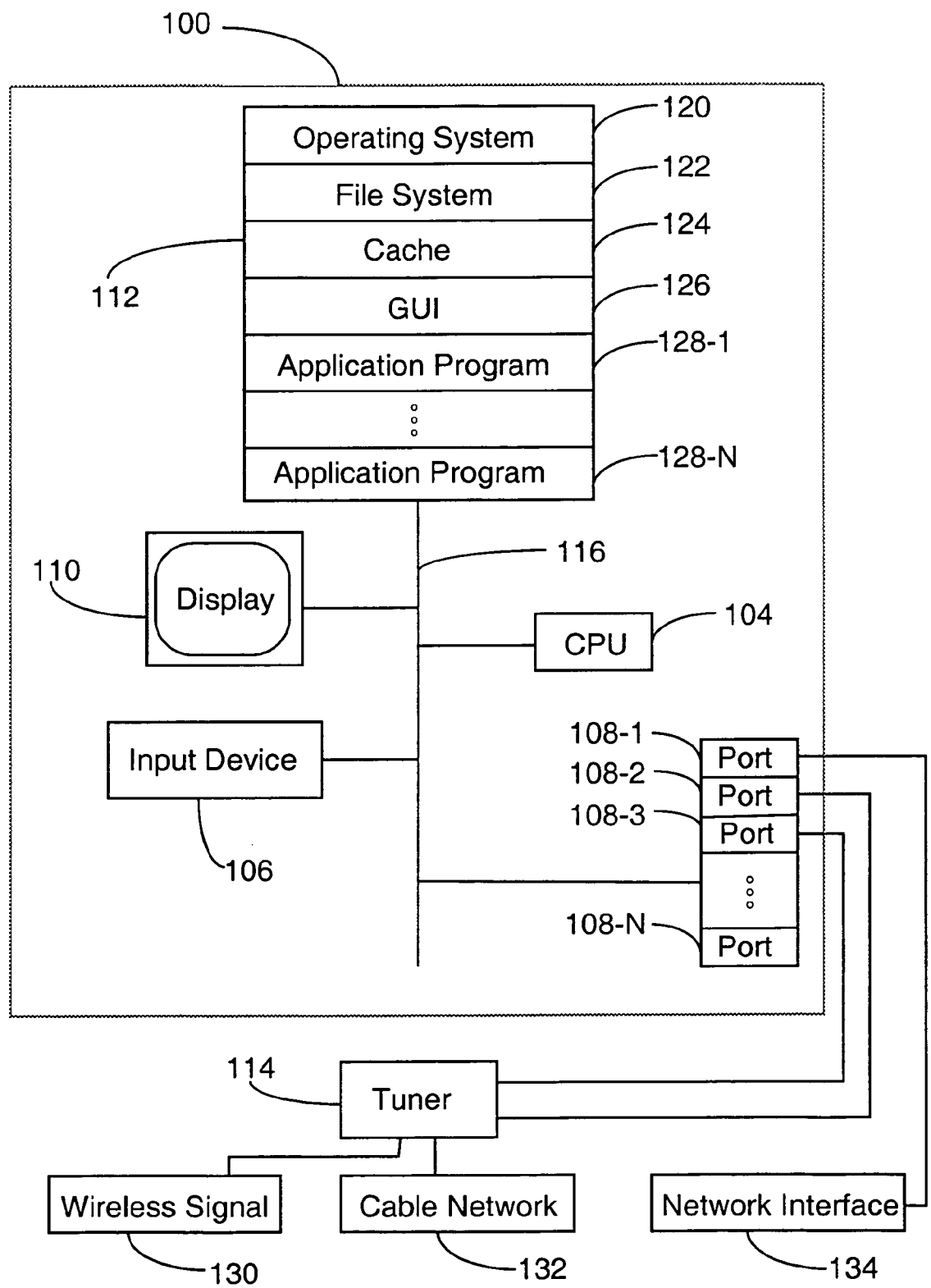
FIG. 2 depicts a system that, in accordance with the present invention, accepts data in at least one form through at least one port and which additionally displays data to a user.

FIG. 2 is a general representation of a data display system 100 within which the present invention may be implemented. System 100 comprises a processor such as central processing unit 104, an input device 106, data connection ports 108-1 through 108-N, a display 110 and a main memory 112, all connected via bus 116. Residing in the memory 112 is an operating system 120, a file system 122, a cache 124 for temporary storage of information, application programs 128-1 through 128-N and a graphical user interface (GUI) program 126 that is responsible for presenting information on to display 110. Information may enter the system through any one of the ports 108-1 through 108-N which may themselves be connected to a tuner 114, or via a network interface 134 to a communications network. If a tuner 114 is employed, it may channel input from a wireless signal 130 or a cable network 132.

In one embodiment of the present invention, system 100 is a personal computer such as a desktop workstation or a portable notebook or laptop computer. In that case the input device 106 may be a keyboard, mouse, trackpad, trackball, or any combination thereof and the display 110 may be a conventional cathode ray tube (CRT) or flat-screen display such as an active matrix or an OLED. The network interface 134 may then be a connection to the internet or to a local area network via a cable and modem or a digital subscriber line or ISDN.

In another embodiment of the present invention, system 100 is a mobile or cellular phone or personal digital assistant and the input device 106 may consist of several buttons on a keypad, a touch-sensitive screen with a touching device such as a stylus, or a microphone and voice-recognition software. In this embodiment, the display 110 is preferably an LCD screen or an electroluminescent display and ports 108 receive data from radio signals or a portable or wireless modem. Consistent with this embodiment, it is also possible that system 100 is, or comprises part of, a hybrid device such as an internet-ready entertainment device that also has a games playing function or the ability to display an electronic book, or has a digital audio function as does an MP3 player. It is also possible that system 100 is a portable navigation system, such as a GPS device, especially one that has an additional functionality such as cellular telephone communication capability or the ability to pick up broadcast radio or TV signals.

In yet another embodiment of the present invention, system 100 comprises a set-top box wherein display 110 is a TV screen or monitor, and tuner 114 accepts input in the form of a wireless signal 130 from broadcast transmissions or cable signals from the cable network 132.

It is consistent with the present invention that, as discussed hereinbelow, system 100 comprises a client device that communicates with a server.

It is also envisaged that the present invention can comprise a device that accepts digital signals from a satellite, such as an "XM" radio transmission. It is further contemplated that the present invention can interface to an in-car navigation and security system that utilizes GPS technology or satellite communication means, such as the "OnStar" system. Accordingly, the present invention may also find application in conjunction with an in-car entertainment and display system.

Input device 106 may be a hand-held remote control apparatus or buttons located on the set-top box or touch-sensitive areas of display 110. Accordingly, the display 110 and the input device 106 need not be part of the same physical device as the device that contains processor 104.

According to the present invention, the processor executes instructions to: control simultaneous communication with a plurality of information sources; partition the display into an array of tiles; associate a first information source of the plurality of information sources with a first tile of the array of tiles and a second information source of the plurality of information sources with a second tile of the array of tiles, such that information from the first information source is displayed on the first tile and information from the second information source is displayed on the second tile, wherein information from at least one of the first source and the second source contains an identifier; retrieve information from the first information source in accordance with a first retrieval rate and retrieve information from the second information source in accordance with a second retrieval rate wherein the first and second retrieval rates are allocated based upon the identifier; and present information to the first tile in accordance with the first retrieval rate and present information to the second tile in accordance with the second retrieval rate.

As is known to those skilled in the art, a graphical user interface is a computer program that resides in memory 112 of some data processing system and that provides means for presenting information, input to and output from application programs 128 or content of datastreams from ports 108 on an associated display. In the background art each datastream is associated with a window. The graphical user interface allows a user to control the arrangement and display format of the data content in each window. Usually a graphical user interface permits a user to specify and alter operating parameters of application programs running on the system, though at any given time a particular application program will take priority, meaning that a particular window will be displaying continually updating content. Typical operating parameters that may be changed depend upon the application program but include the number of buttons on a tool bar and number of visible toolbars, the size of the text displayed and the color of the background.

By contrast, the graphical user interface of the current invention not only permits a user to control the layout of the data content but to prioritize each application program running on the system and each datastream of interest. A novel feature of the present invention is that the data content of any number of the programs can vary in real time and the rate at which the display of each is updated can be controlled by the user. Furthermore, in another embodiment, in the absence of initial preferences specified by the user, the present invention is able to assign a rate at which the display of a tile is refreshed according to the type of data or according, for example, to an identifier that is presented with each datastream or source of information.

When the present invention assigns a refresh rate to a tile according to the type of data, it is envisaged that the type of the data is automatically recognized or ascertained. For example, according to this embodiment the present invention distinguishes between types of data such as video, audio and web-based content, based on the format of the datastream in question and preferably assigns a higher priority to types of data that vary in real time, such as video or audio content.

When the present invention assigns a refresh rate to a tile according to an identifier presented with each source of information, the nature of the identifier may vary according to the type of data or the protocol that is employed for its transmission. In preferred embodiments, the identifier is a tag that is associated with a "Quality of Service" (QoS) implementation. As is known to one of skill in the art, QoS refers to the ability of a data communications system to define and differentiate levels of performance. For example, in internet protocol (IP), QoS tags are presented as specific pre-set bits in packet headers. When the packets are received, a priority can be assigned according to the bits that have been set. For a description of QoS in the IP context, see, for example, www.ittc.ukans.edu/~rsarav/ipqos/ip_qos.htm. A finer granularity of QoS is possible using Resource Reservation Protocol ("RSVP"). For a description of QoS in wide area networks (WAN), see for example, www.cisco-.com/warp/public/cc/so/neso/vvda/avvid/eeqos_ds.pdf. In networks that communicate via Asynchronous Transfer Mode (ATM), each distinct datastream has an identifier, often called a "virtual channel identifier," that accompanies each of its packets (or cells). In a preferred embodiment, the identifier is contained within a header attached to each packet or cell. QoS is achieved by discriminating between datastreams according to their different identifiers. QoS may be controlled by adjusting parameters that include a packet loss ratio, a packet cell delay variation, a maximum packet loss transfer delay and a mean packet transfer delay. A user's desire in respect of the priority to be accorded to a particular datastream is communicated amongst the various nodes in the network. A more detailed description can be found in, for example, *High Performance Communication Networks*, Walrand, J. and Varaiya, P., Morgan Kaufmann Publishers, Inc., (1996).

Accordingly, an identifier suitable for use by the present invention for assigning a refresh rate to a tile includes a bit or bits in a packet header, or a tag that accompanies or is in the header of a cell or packet.

Consistent with altering refresh rates according to a QoS concept is that the level of packet loss can be adjusted according to the priority level associated with different types of data. Furthermore, a fully-implemented QoS capability permits prioritization based on criteria other than the type of the data. For example, traffic can be prioritized according to the IP address of a source or destination device. Traffic can also be differentiated based on whether or not they are real-time, such as voice or video.

Tile Objects

In the ensuing discussion, tile objects are introduced and described and contrasted with existing elements of graphical user interfaces. A tile presents content from any information source.

Figure 3:
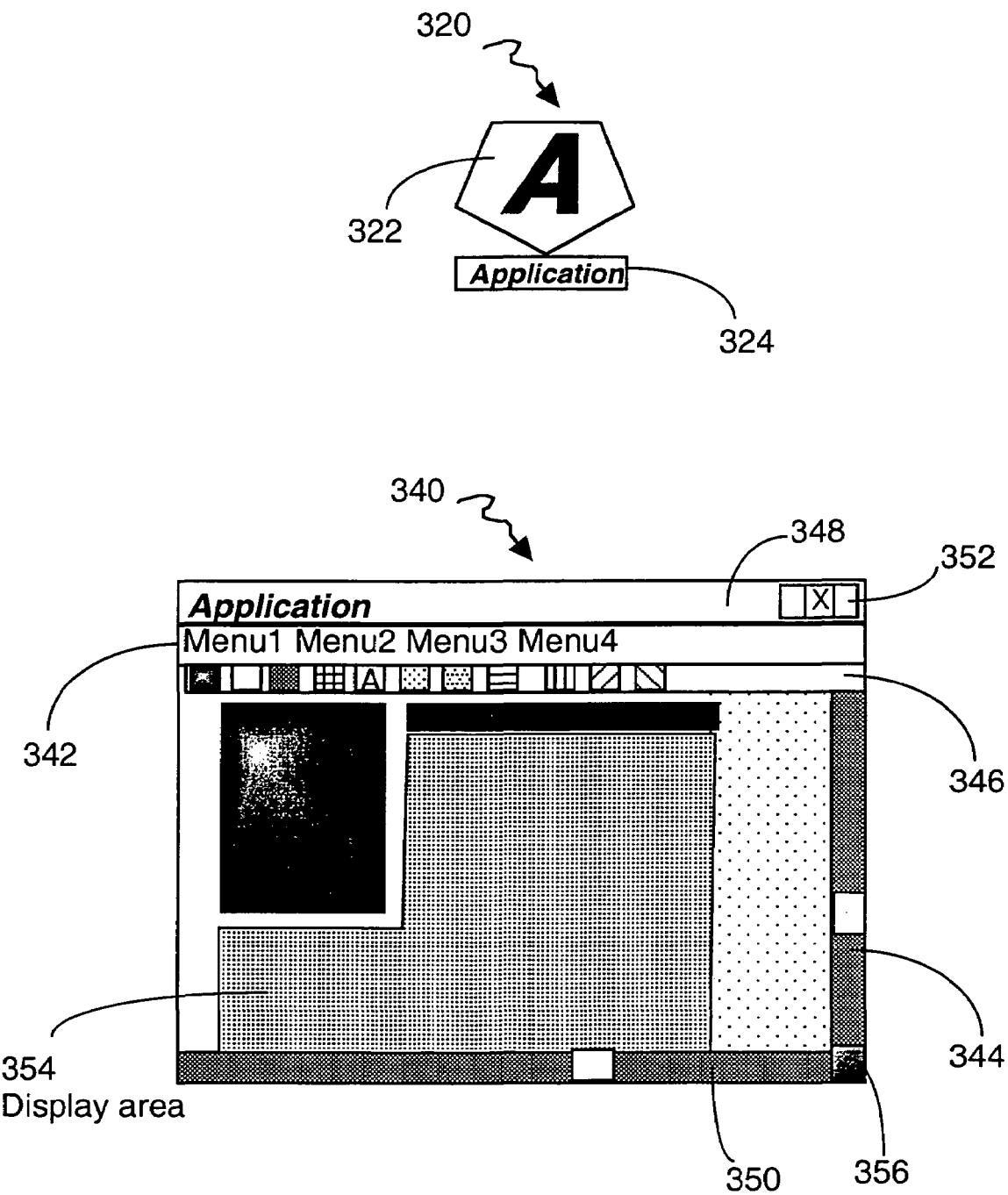
FIG. 3 shows stylized examples of an icon and an application window as are commonly found in computer display systems of the background art.

Conventional graphical user interfaces of the background art provide two distinct representations of programs, files and datastreams, as shown in FIG. 3. One representation is an icon 320, the other is a window 340. An icon typically occupies only a relatively small proportion of the available display area and comprises an easily recognizable depiction of the program or file, either through its logo 322 or some characteristic picture with the name 324 of the program visible. An icon can be selected by, for example, a touch screen pointer, a cursor controlled by a mouse with a button or by a keyboard stroke or any combination of the foregoing. In response to a further selection operation on an icon, for example a double-click of a mouse button, the graphical user interface will provide a window that can be used to communicate further information to the program or review the associated datastream.

A window 340 may occupy a substantial percentage of available screen space, usually 90-100%. The window 340 usually comprises a title bar 348 and a display area 354. The window 340 can commonly be resized by the user for example by using buttons 352 or a draggable area 356 and has a format which contains many active areas around its borders. Examples of active areas include a menu bar 342, a vertical scroll bar 344, a horizontal scroll bar 350 and one or more tool bars 346. Each active area may be used to control aspects of the window's appearance or to set parameters specific to the operation of the program associated with it such as text formatting options in a word-processing package or redirection of a web-browser to its stored home location.

In the present invention, a third graphical representation of programs and files, herein called a tile, is introduced. Tiles permit "dynamic bookmarking" of information in that each tile is a viewer of a single information source—including streaming data sources—and can be customized with the user's choice of content as well as initialized with sets of options that are pre-determined by the software of the present invention according to the type of data that the tile displays.

A tile is different from an icon because it provides a real-time or near real-time view of the underlying information in that it contains continually refreshed content. A tile is different from a window because a tile will typically be smaller in size than a window, allowing the user to view multiple tiles simultaneously if desired.

A tile provides an at-a-glance view of the current status of the program or file associated with it but does not necessarily have the large number of active areas associated with windows such as title bar, menu bar, toolbars, and scroll bars. Therefore tiles lead to a reduction in clutter on the display screen because many tiles may be displayed simultaneously without overlapping with one another in the way that windows must necessarily do. Tiles are superior to icons because they give an immediate indication of the current state of the file or program and have utility functions associated with them, as described hereinbelow. Another advantage of using tiles is a uniformity of appearance between tiles which correspond to different programs and datastreams. The display content of a tile will differ from application to application though its size and format need not.

A tile is associated with a program, file or datastream, similar to the way in which an icon and a window are. A tile may present data in any of a number of ways. For example, in a preferred embodiment, the tiles may present a miniaturized, "thumbnail" view of the underlying information; a "porthole" view of a portion of the underlying information as viewed at full size; a symbol indicating whether the information has been updated since it was last viewed; or a custom interface designed to allow rapid access to the underlying information. The way in which a tile displays content may be independently configured for each tile and may be set up in a default manner that depends upon the type of information being displayed.

FIG. 4 illustrates representative tiles. Tile 402 displays a picture or graphic such as may be stored in a bit-map, JPEG, TIFF or GIF file, or on a world-wide web page. The content of tile 402 is typically a miniaturized representation of a graphic or still-frame from a datastream. Tile 404 displays a portion of a text document or text of a world-wide web page. In this sense the tile functions as a transparent panel placed on top of a document, thus permitting a portion of the document to be displayed. Tile 406 displays a further array of tiles that may be displayed in full by expanding tile 406 to occupy the full area of the display. Tile 408 has been configured to link to an electronic mail program. An alarm setting associated with tile 408 has been configured so that the tile displays an envelope and the message "New Mail!" when an unread message has been received by the mail program. Tile 410 displays a name, "FM 101", denoting the title of a broadcast signal, in this case audio, that is associated with the tile. Tile 412 displays a "thumbnail" of the document viewed in a window such as 340. A "thumbnail", as used herein, is a miniaturized representation of an image that retains sufficient characteristics to permit easy recognition of the image. For example, if the document displayed in a window were a document with multiple pages, tile 412 may display a thumbnail of the first page of the document.

Tiles are selectable and live. When a tile is selected, whether by mouse click or otherwise, the tile instantly provides the user with access to the underlying information, whether that data be a hierarchical menuing system leading the user to a different level or tiles, a word processing file stored on a local area network, a spreadsheet stored locally on a user's computer, HTML file on the Internet, or a television signal. The tiles are live in that each contains real-time or near real-time information.

In a preferred embodiment a selection operation is associated with a tile. For example, clicking on a tile will cause it to immediately refresh its contents. Selecting tile 402 causes the most recent frame of the video stream to be displayed by the tile, or, if the picture were obtained from a static graphic file, causes the most recent version of the file to be displayed by the tile. Selecting tile 404 or tile 412 causes the most recent version of the document to be displayed.

In a preferred embodiment, a second selection operation is associated with a tile. For example, double-clicking a tile causes that tile to occupy a substantial fraction of the whole display area. In this embodiment, double clicking tile 402 or 412 causes the image to be expanded to fit the whole display area. In an alternate embodiment, selecting a tile causes it to occupy an area in the middle of the display that is larger in area than a single tile but does not occupy the full display. If tile 404 were double-clicked, as much of the document as could be displayed in the enlarged tile in regular font size becomes visible. Double-clicking tile 408 causes the mailbox window of the e-mail utility to be sufficiently enlarged to allow new messages to be selected and read. Double-clicking tile 410 causes the audio stream to become audible over the appropriate channel of the system and need not necessarily cause the tile to occupy a substantial fraction of the display area.

Figure 5:
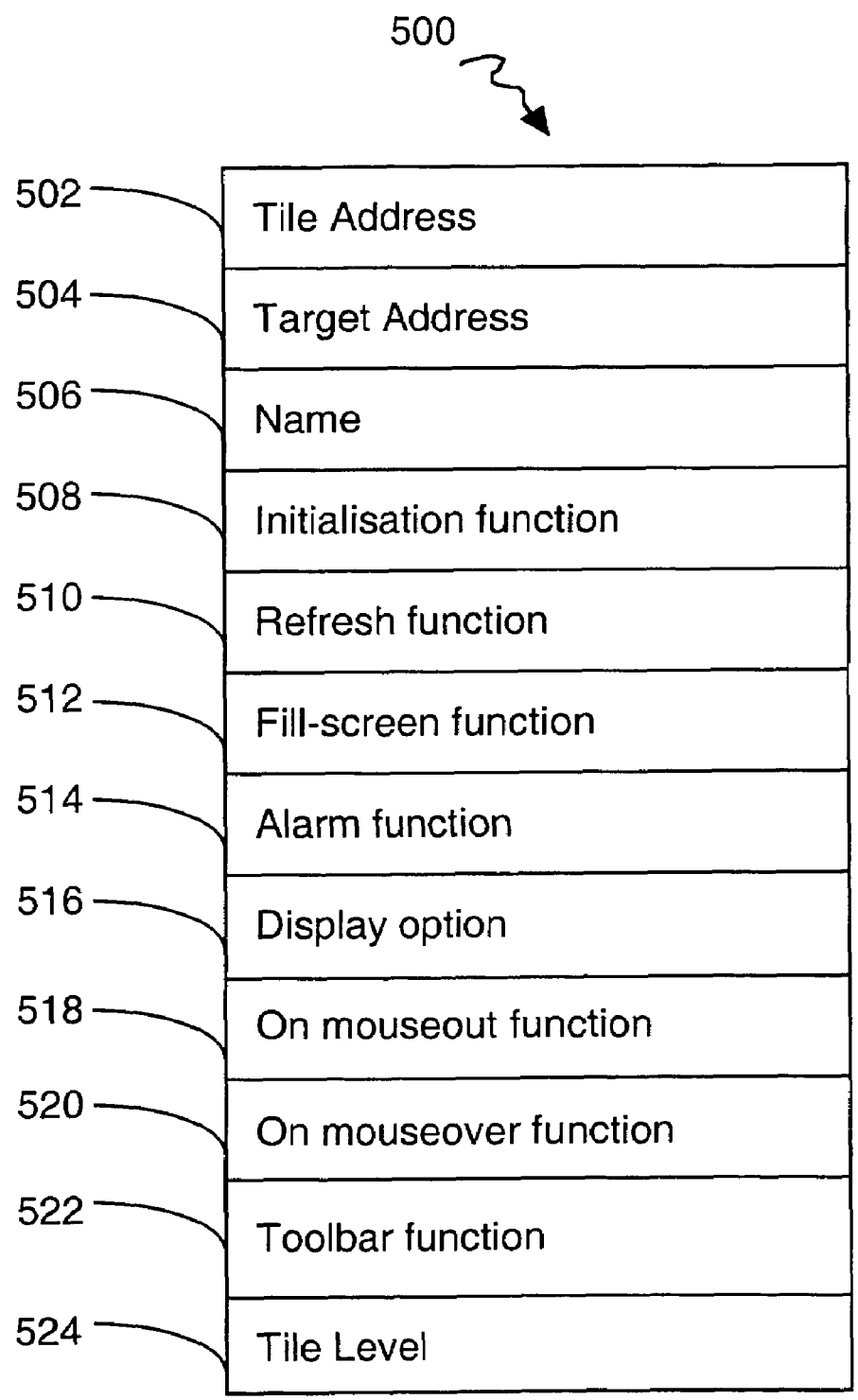
FIG. 5 shows an exemplary data structure of the tile object within the graphical user interface of the current invention.

A representative tile data structure 500 is shown in FIG. 5. It is important to understand that the tile itself is an image that at any given instant is resident on the file system. This image is separate and distinct from the application program or file associated with the tile. The tile data structure 500 comprises two addresses: a tile address 502 that defines the location on the file system where the tile image is stored; and a target address 504 that is the location at which the file or application program associated with the tile can be found. Additionally, the tile data structure contains a name 506 that may be displayed on the tile in certain circumstances. Tiles of the present invention may be assigned at least seven functions, including but not limited to: an initialization function 508 that is responsible for establishing a connection with the target address 504; a refresh function 510 that handles updates to the tile image stored at the tile address 502; a screen-size function 512 that stores the dimensions of the display area filled by the tile upon receipt of a request; an alarm function 514 that permits the tile to display an alarm or warning when the application program associated with the tile encounters a designated event; an on mouseover function 518 and an on mouseout function 520 which control the behavior of the tile when a selection tool such as a mouse-controlled cursor is placed respectively on and off the tile; and a toolbar function 522 which may permit an array of special buttons to appear on or adjacent to the tile for the purposes of adjusting properties of the tile.

Refresh function 510 is able to indicate a retrieval rate at which information is retrieved from a source of information so that the information is displayed and refreshed in the tile.

Preferably refresh function 510 is able to interpret an identifier that accompanies the information displayed by the tile. In one embodiment, a tile is configured so that a right-click of a 2- or 3-button mouse while the cursor is over the tile would activate the tool-bar function. In a preferred embodiment, right-clicking on a tile can reveal a menu of options that enables the user to ascertain properties of the tile, such as the bandwidth it is consuming.

In one embodiment of the present invention, the tile is itself a document created in a markup language such as HTIML or XML as shown in FIG. 6 and is suitable for display in a web-browser. In this embodiment, a tile occupies a position in a table defined with elements of mark-up language which will be familiar to one skilled in the art. Tile-specific attributes are introduced which control the way in which a web-browser displays the tile. In the example in FIG. 6, the tile has a clickable map, i.e., separate areas of the tile produce separate results when clicked. Also, this tile has a toolbar, which in one enibodiment may appear if the mouse is right-clicked when the cursor is over the tile.

In another embodiment of the present invention, tiles communicate with one another and have conditional content. That is, the content of one tile depends upon the content of another. Such conditional content enables more than one tile to be refreshed simultaneously, or nearly simultaneously, by requesting a given tile to be refreshed. Alternatively, a tile may be set up to specify one or more other tiles whose contents are linked to it. For example, a first tile may show a web-based listing for the Nasdaq Stock index, and one or more conditionally dependent tiles may link to web pages that show the weekly, and yearly fluctuations of the index and the performance of previously chosen stocks.

In a preferred embodiment, tiles are categorized into a number of levels, arranged hierarchically so that tiles in each level have priority over those in other levels. Such a priority indicates that tiles with highest priority will refresh most frequently. Accordingly, each tile has a tile level 524 in this embodiment. In one aspect of this preferred embodiment, priorities are assigned according to the type of data that is displayed by the tile. According to such an aspect, the highest priority is assigned to a video or web-based conference, for example; the next priority is assigned to a video-stream such as a movie or broadcast TV signal; a third priority is attached to a media player such as RealPlayer; and lower priority tiles handle local applications and files. Tiles within a given level can be set up to compete equally for available system resources and bandwidth.

Grid Object

The arrangement, layout and independent functioning of the tiles on the display and exemplary software for their control is now described with respect to FIGS. 7-13.

Figure 7:
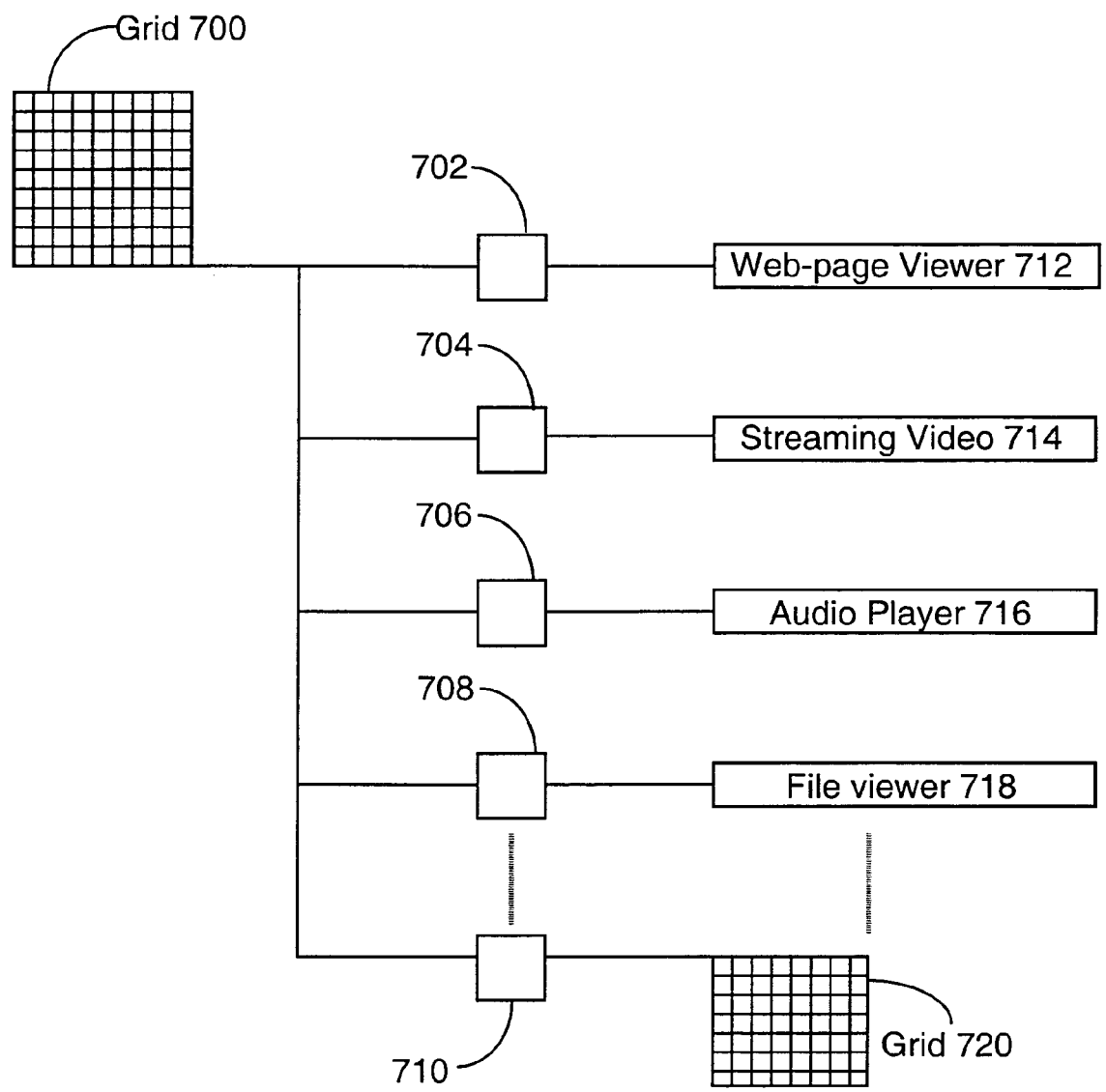
FIG. 7 shows the hierarchy of software objects underlying the current invention, comprising a grid object, tile objects and files or application software.

The overall hierarchy of a graphical user interface embodied by the present invention is summarized in FIG. 7. The Grid 700 is the top level functionality to which application programs are subordinate. The grid can replace the functionality of a user's computer desktop and offers similar and additional features. Grid 700 comprises a matrix of tiles of which tiles 702, 704, 706, 708 and 710 are representative. The user can control the grid in such a way that the tiles 702, 704, 706, 708, and 710 present simultaneous information content from a plurality of sources. The grid controls the layout and priorities of the tiles. Each tile is associated with a data stream or application program thereby permitting a number of different images to be displayed simultaneously. In particular, different tiles can be associated with different contents. For example, tile 702 is connected to a web-page viewer 712 such as a browser. Tile 704 is connected to a source of streaming video 714, such as Real Player. Tile 706 is connected to an audio player 716 such as a CD-player program or a source of streaming audio such as Real Audio. Tile 708 is connected to a file viewer 718 such as a text-editor or a word-processing package. Tile 710 is associated with another grid object 720, thereby permitting a "layering" of information hierarchies. In a preferred embodiment, a grid embodies a similar underlying data structure to a tile.

Each tile is separately associated with a source of information, for example, an application program, datastream or file, any one of which may be another grid object. Such a hierarchical structure permits a user to organize programs and information through the graphical user interface. For example, separate categories of information can be displayed on separate grids allowing each grid to be associated with a theme. In one embodiment, a grid can be configured to be populated with a fixed number of popular web pages based on, say, most recently visited URL's, or most frequently visited URL's over a period of time such as a week or a month.

In a preferred embodiment, a source of information has an identifier, such as a quality of service tag, associated with it. The grid assigns a priority to a tile based upon the identifier, or based upon the type of data that the source of information comprises. Where tiles are ranked into levels, the grid assigns an information source to a tile in a level that is appropriate for the type of data or the identifier associated with the information source. In this way, a tile can be automatically given a priority that is appropriate for the type of information that it is to display.

By using the native attributes of a tile, a user may specify a presentation of the grid, consisting of its dimensions, (i.e., the number of tiles to display and their arrangement), and the programs or files to be associated with each tile. A single grid, composed of multiple tiles, may therefore present a number of information sources simultaneously.

Together, the grid and tiles comprise the application through which a user can view simultaneously information from a multitude of available sources including multiple sites on the Internet or some other distributed computer network, receive signals from multiple broadcast channels, and open and view multiple files. In its initial embodiment, the application may be run through conventional computer operating systems, whereupon it overlays the user's desktop and acts as if it were a "borderless browser". Therefore the application resides over existing applications without replacing any of them; rather it enables them to be called from the grid itself. The application, therefore, becomes a graphical file manager in which the content of continuously changing files, e.g., datastreams, is being displayed in real-time or near real-time, depending on the assigned priority. Effectively, the application can be used instead of the user's computer "desktop" because it has a more visually intuitive dynamic menuing system than a traditional desktop.

In a preferred embodiment, a grid of tiles replaces the functionality of the computer "desktop" utilized by many modern computer operating systems. Whereas a desktop is typically populated by static icons and tool bars, a grid of tiles instead presents to the user an array of snapshots of current programs and files. The essence of the grid is that its content is dynamic and informative. As previously discussed, icons are inherently limited in the information that they can present and windows clutter the entire desktop without permitting more than one to be readily displayed simultaneously. By contrast, each tile on the grid can show the current status of the data or datastream associated with it. The fact that a tile may refer to a separate grid permits nesting of grids and consequently a hierarchy of organized information sources.

The grid also understands the interests of the user and acts as a repository for passwords and identifiers to subscription services. In this way, it is not necessary for a user to remember and enter a user name and password to access data requiring such a log-in. In this same vein, Internet sites of interest can be "bookmarked" and stored by the grid, each such site possessing its own tile. The grid is also nestable in that a tile in one grid may point to a separate grid and tiles in the separate grid may point back to the first grid or to yet more grids. If desired, a user can impose a "theme" on a grid and thereby categorize, group, and/or otherwise manage his data sources. In this manner, the user can group tiles relating to particular subject matters, Internet sites, documents, or otherwise in a grid according to some speciality. A tile in such a grid could link to another grid to provide a connection between related categories. Equally, a tile on one grid can point to the same information source as a tile on another grid.

Figure 8:
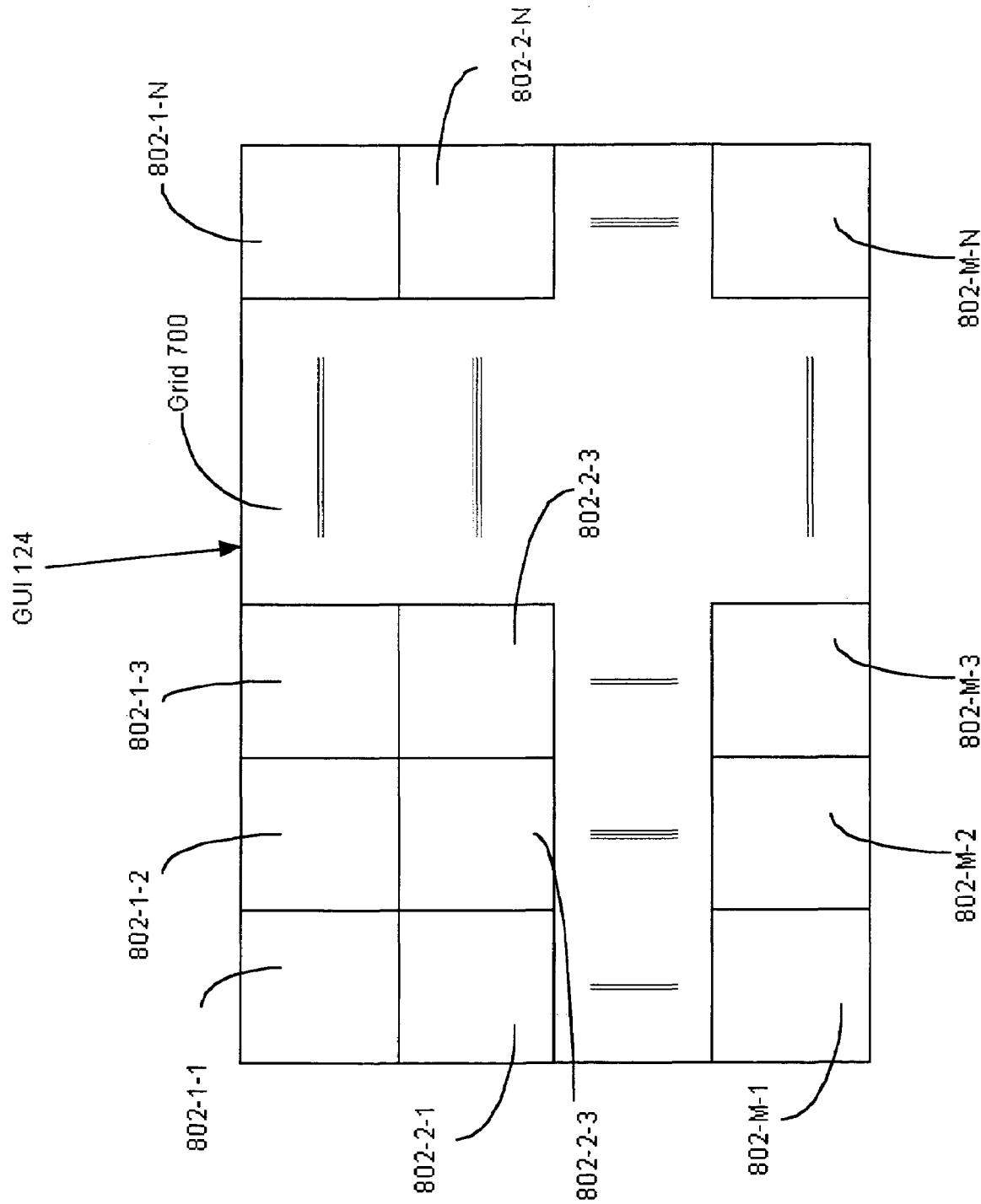
FIG. 8 shows an exemplary layout of the display produced by the current invention.

In a preferred embodiment, the grid permits a regular layout of tiles on the display screen such that the tiles are uniform in size and shape, as depicted in FIGS. 8-11. Each tile is indexed by its position on the grid. For example 802-2-1 is the first tile in the second row. Tiles in the first row of the grid are 802-1-1, 802-1-2, 802-1-3 and so on, to 802-1 Tiles on the second row are 802-2-1, 802-2-2, 802-2-3 and so on, to 802-2-N. And, tiles on the bottom row are 802-M-1, 802-M-2, 802-M-3 and so on to 802-M-N. There are no gaps between the tiles, the tiles are not permitted to overlap and the whole grid is covered by tiles. FIG. 8 shows one embodiment in which all tiles are the same size and are presented in an array comprising M rows and N columns. There is no particular requirement that the arrangement consists of more than one row and more than one column. On the display of a mobile telephone or smart phone, for example, a single row of tiles may be apposite. In a preferred embodiment, a display of a smart, cellular or mobile telephone presents a single tile at any one time but it is possible to scroll from tile to tile across the grid, by using, for example, buttons on the phone, or other methods of control.

Figure 9:
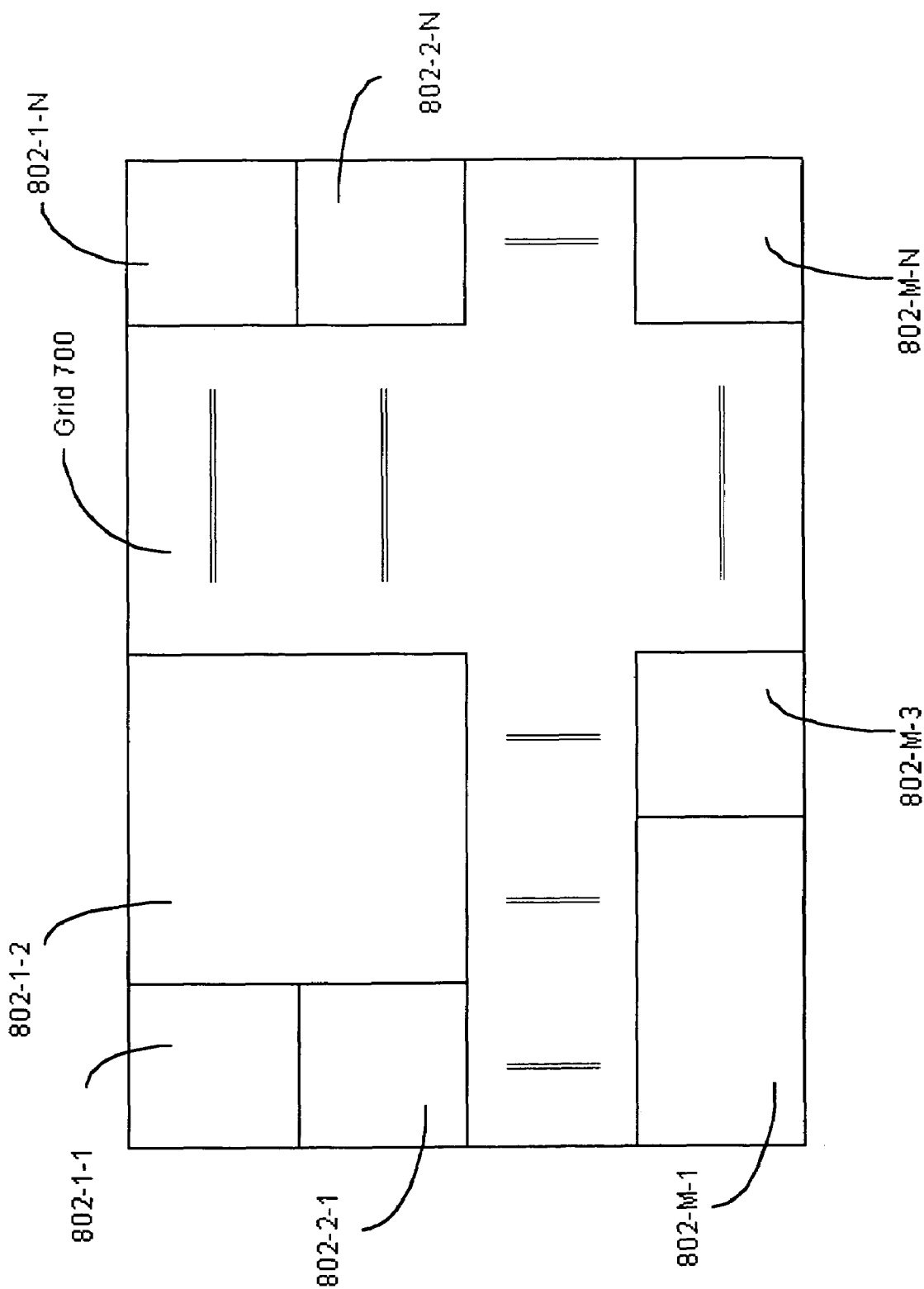
FIG. 9 shows an alternative exemplary layout of the display produced by the current invention.

FIG. 9 shows an arrangement in which there is a unit tile size, that of tile 802-1-1, but tile 802-1-2 and tile 802-M-1 have each been configured to occupy regions of the grid equal to exact multiples of the unit tile size. Such an arrangement may be useful and important if one or more datastreams is of particular interest but the others are also to be monitored at the same time.

Figure 10:
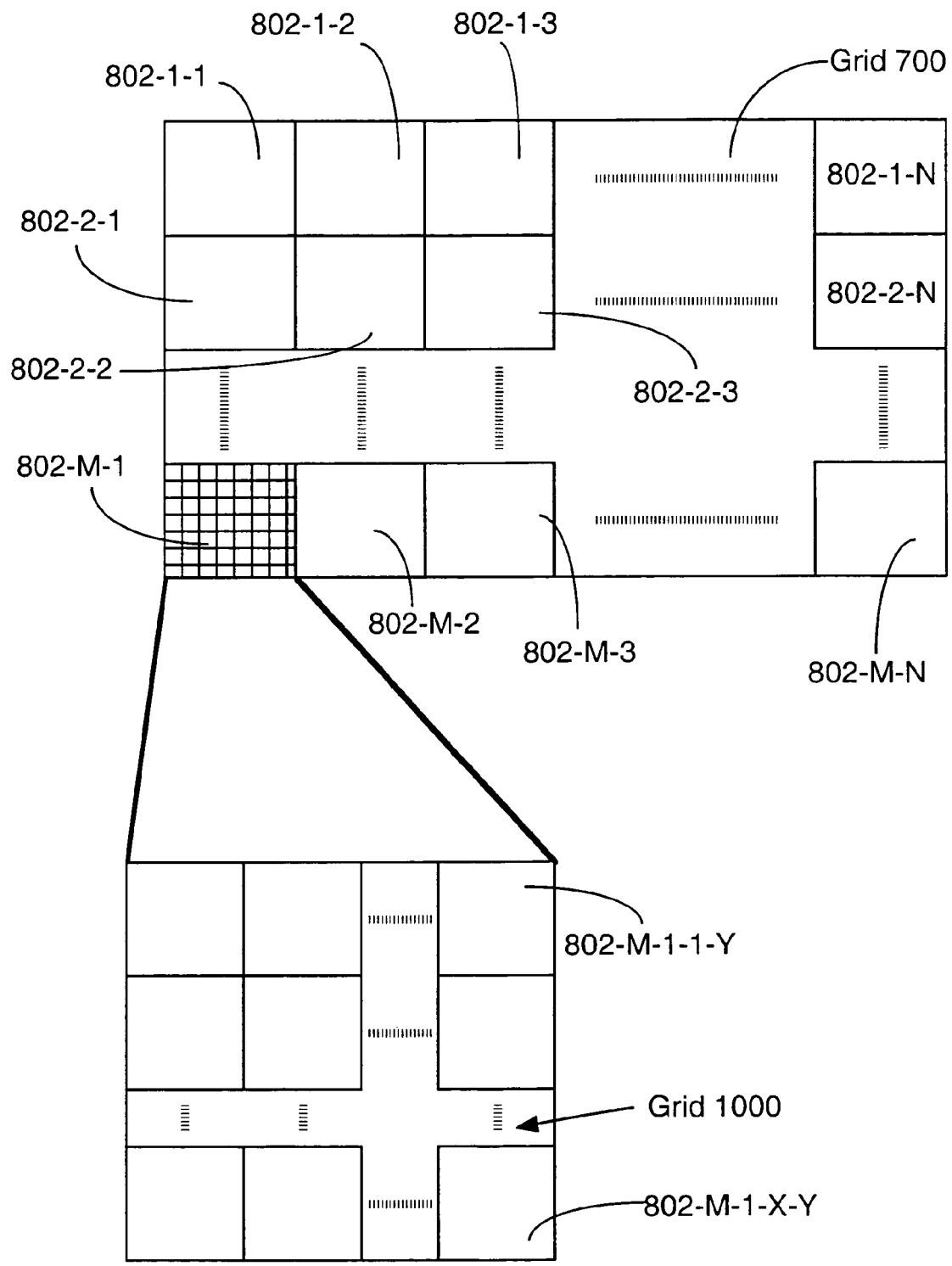
FIG. 10 shows an exemplary layout of the display of the current invention wherein a tile contains another instantiation of a grid.

FIG. 10 shows an arrangement of tiles in which Tile 802-M-1 is associated with a further grid 1000. The lower half of the figure shows an enlarged perspective of that tile showing a grid with Y columns and X rows.

Figure 11:
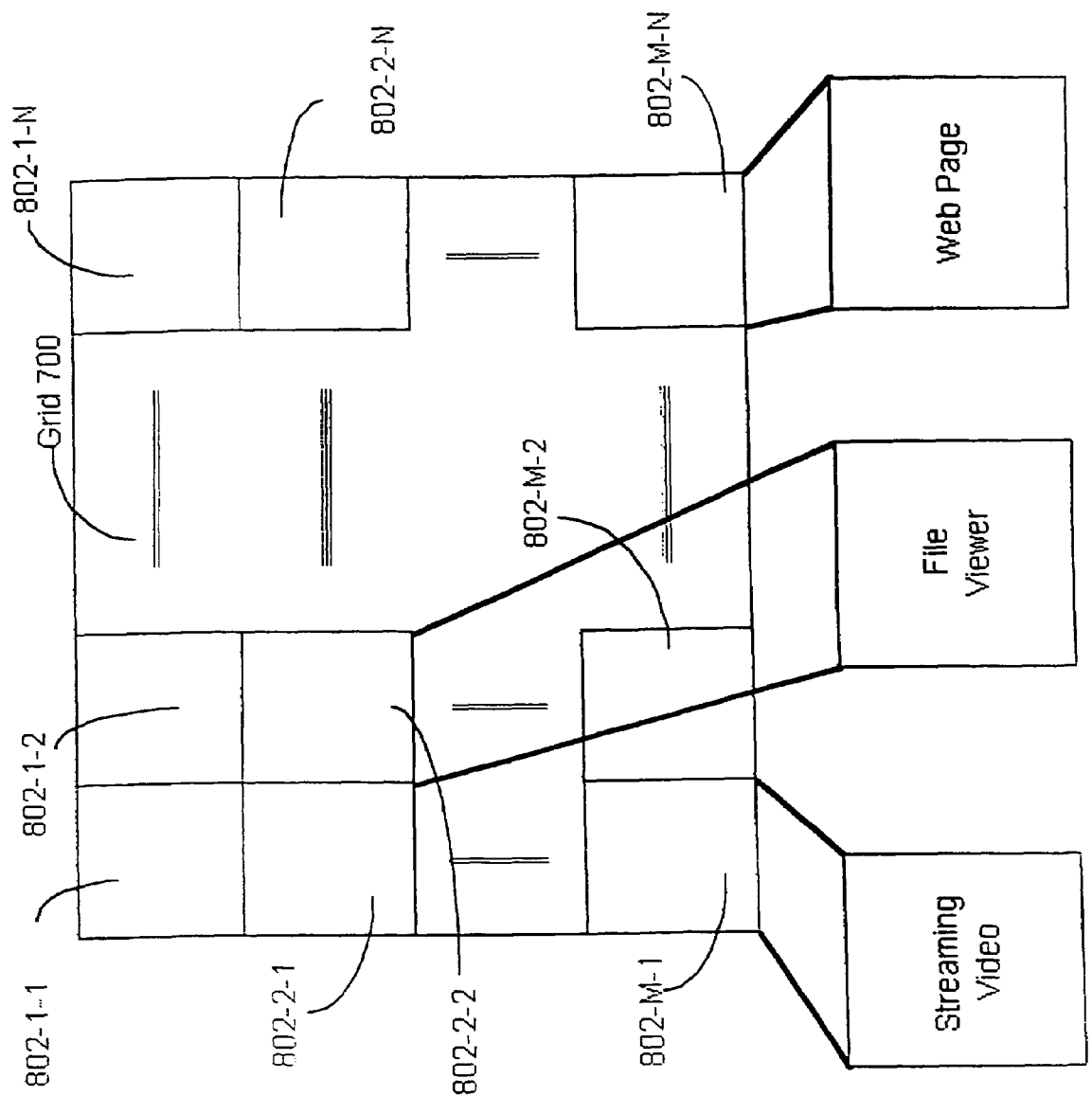
FIG. 11 shows an exemplary layout of the display of the current invention including specific examples of tile contents.

FIG. 11 shows an arrangement of tiles in which are depicted different application programs associated with three of the tiles. Tile 802-2-2 links to a file viewer displaying a specific file; tile 802-M-1 presents streaming video; Tile 802-M-N depicts a page of information on the world wide web.

Figure 12:
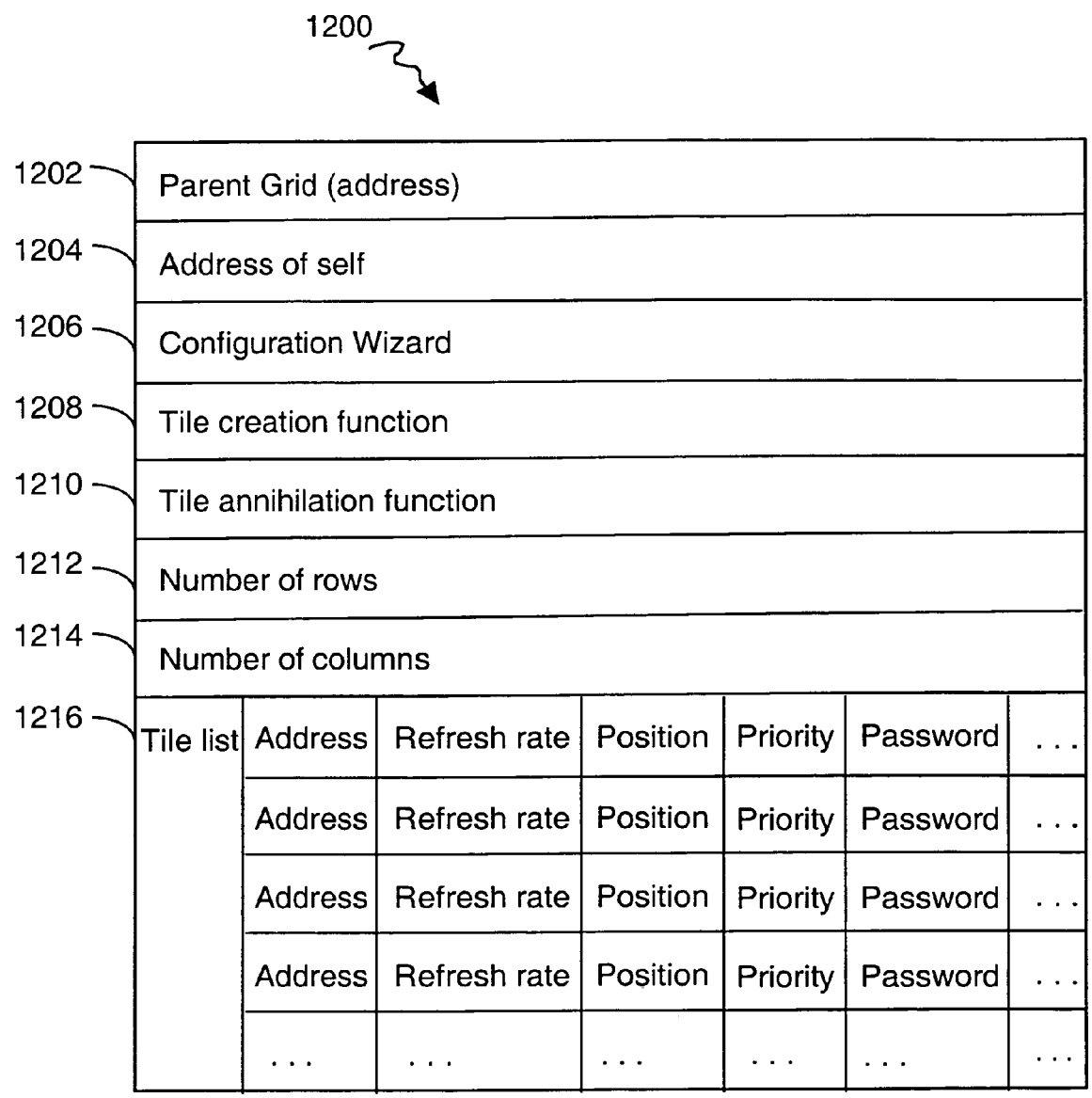
FIG. 12 shows the data structure of the grid object which forms part of the graphical user interface of the current invention.

FIG. 12 shows a schematic data structure of the attributes of one embodiment of grid object 700. The architecture shown in FIG. 12 applies to any grid, including a top-level grid 700 shown in FIG. 7 as well as to a grid that is contained within a tile.

Significantly, the grid manages the flow of information to the tiles. For example, the grid can communicate with the display device in order to determine its current configuration and allocation of resources. In one embodiment, using a so-called "carousel" approach, the grid continually cycles around the currently displayed tiles, one by one, refreshing the content of a tile each time it is accessed. When a given tile is refreshed, the refresh operation is completed before refreshing the next tile in sequence. In this way, the cycling rate may be set so that the current content of all tiles are reasonably up to date. The cycling can be interrupted by a user selecting a given tile, so that that tile alone becomes continuously updated. In this way, the user does not need to worry about manually refreshing multiple tiles.

In a preferred embodiment, according to priorities that may be applied to individual tiles on a tile by tile basis if desired, the grid manages the refresh rate of each tile in the grid. For example, for locally stored word processing or spread sheet files, the user might configure the tiles to refresh only when the underlying data is written to the local hard drive. Similarly, a user might configure tiles containing infrequently updated Hyper-Text Markup Language ("HTML") data from the Internet to refresh at a certain time each day. At the other extreme, a user might configure an active tile to display a television channel at a refresh rate of 29 frames per second, while at the same time configuring inactive tiles to display different channels at a refresh rate of once every five seconds. In this way, a user could monitor many channels until program content of interest appeared in one of the tiles without the burden of actively refreshing each tile.

In another embodiment, the grid itself assigns priorities to the tiles based on identifiers such as quality of service tags that are associated with the information source itself. In still another embodiment, the grid automatically assigns priorities to the tiles based upon its recognition of the type of data that is presented to it. In this way, the grid can associate information sources with tiles that occupy different levels of priorities in a hierarchy of levels, if present. It is to be understood that an identifier such as a QoS tag can be used to assign to a tile a priority that is higher than that of another tile that would display the same type of data, and would have the same priority in the absence of such an identifier. Thus, for example, QoS tags can be used not only to assign two videostreams a higher priority than a web-browser tile, but can be used to prioritize one videostream over another. It is also to be understood that not all information sources need be accompanied by identifiers for the grid to be able to assign priorities itself. In the absence of an identifier for a particular information source, the grid can assign a priority based on the type of data, a user preference or some arbitrarily low priority based on other considerations such as bandwidth and availability of other system resources.

The grid itself has an address 1204 that specifies its location within the file system of the device in which the application program program runs. The grid has associated with it several utility programs: a configuration wizard 1206 that may be called by the user when setting up a new grid; a tile creation function 1208 utilized by the configuration wizard when initializing new tiles; a tile annihilation function 1210 utilized in case of error or when resizing the grid.

The grid object stores the number of rows 1212 and the number of columns 1214 of tiles that are present. The grid also stores a tile list 1216 containing attributes of each respective tile. In particular, the address of each tile, its priority and its refresh rate are stored by the grid program. The grid also stores other attributes of tiles such as their respective positions on the grid as given by their column and row number. The priority of a tile may be used to determine its refresh rate in one embodiment of the present invention. A tile can have a password feature built into it if it is desired to restrict access to the tile's content. The grid itself can have a toolbar by which its attributes may be accessed and modified.

In a preferred embodiment, a grid is a special form of a tile. It is a tile that can create and manage an array of other tiles. Accordingly, its data structure also comprises those elements of a tile data structure shown in FIG. 5 in addition to those shown in FIG. 12. If the grid has a parent grid, the address of the parent grid 1202 is stored. For example, grid 1000, associated with tile 802-M-1 of FIG. 10, has grid 700 as its parent.

The grid can be configured to contain any number of tiles, from one to as many as can reasonably fit on the user's display.

In one embodiment of the present invention, the grid is a document created in a markup language, such as HTML, SGML or XML, and is therefore suitable for display via a web-browser. In this embodiment, the addresses of the parent grid, the grid itself and each of the tiles are expressed as Uniform Resource Locators (URL's). The various functions controlled by the grid are accessible through function calls devised according to methods familiar to one skilled in the art. For example, "dynamic HTML", java applets or simple CGI-scripts can provide the technological basis for enabling various grid utilities. FIG. 13 is illustrative code for establishing a grid.

The application program may be downloaded from a pre-determined web-site and preferably operates in a client-server mode. Users may download preconfigured grids from the predetermined server. A grid configuration "wizard" program which guides a user through a step by step set up of a custom-grid may also be downloaded. Other web hosts are able to deliver content to end-users via the predetermined server. Some basic functions of the grid can be carried out on the predetermined server and provided to the user. According to the capabilities of the device on which the grid is displayed, the server may take on more demanding functions.

Grid Configuration Wizard

In one embodiment of the present invention, the set up of a particular grid is achieved through a grid configuration program ("wizard") that is downloaded to the display device from a remote site. The grid configuration program permits a user to define and install one or more grids on the client system. When a tile is partitioned into a further array of tiles, the grid configuration program can also be used. One embodiment of the user interface of the grid configuration wizard is shown in FIG. 14.

A first screen displayed by the grid configuration wizard comprises an application program logo 1404, button 1406 to guide the user to the next screen and a number of choices, such as 1408. The user is offered the choice of preconfigured, or "standard" grid configurations, selected from a list. Examples of such grids include grids themed by content such as sport-related grids or by type of-data such as grids whose content is video-based.

Additionally, the user is permitted to configure "customized" grids in which each tile can be taken from a list of predefined samples or can be initialized according to the user's wishes. For example, a user can assign a priority to a tile, or can select a tile from a hierarchical scheme of pre-defined priorities, or can specify that a tile set its own default priority by recognizing the type of data that it receives or an identifier such as a QoS tag associated with that data. In a second screen 1412 displayed by the grid configuration wizard, a tiled area 1416 represents the grid that the user is building. Sample tile categories 1418 such as "weather", "news", "stocks", or "sports" are listed. In an alternate embodiment, a grid can be filled by the "drag and drop" technique in which a selected document 1414 is moved on to the display area of the grid configuration program and automatically becomes a tile. A button 1410 offers the user the chance to go back one screen.

In a third screen 1420 displayed by the grid configuration wizard, the user can name the grid and, optionally, store it for future reference, for example in an archive of preferred grids. The user can elect to finish grid construction by clicking the "Finish" button 1412, or launch the grid immediately by activating button 1422. When launching the grid immediately, the grid is automatically constructed on the fly according to the content and tile types specified by the user during the set up procedure.

Architecture of Application Program Software

Figure 15:
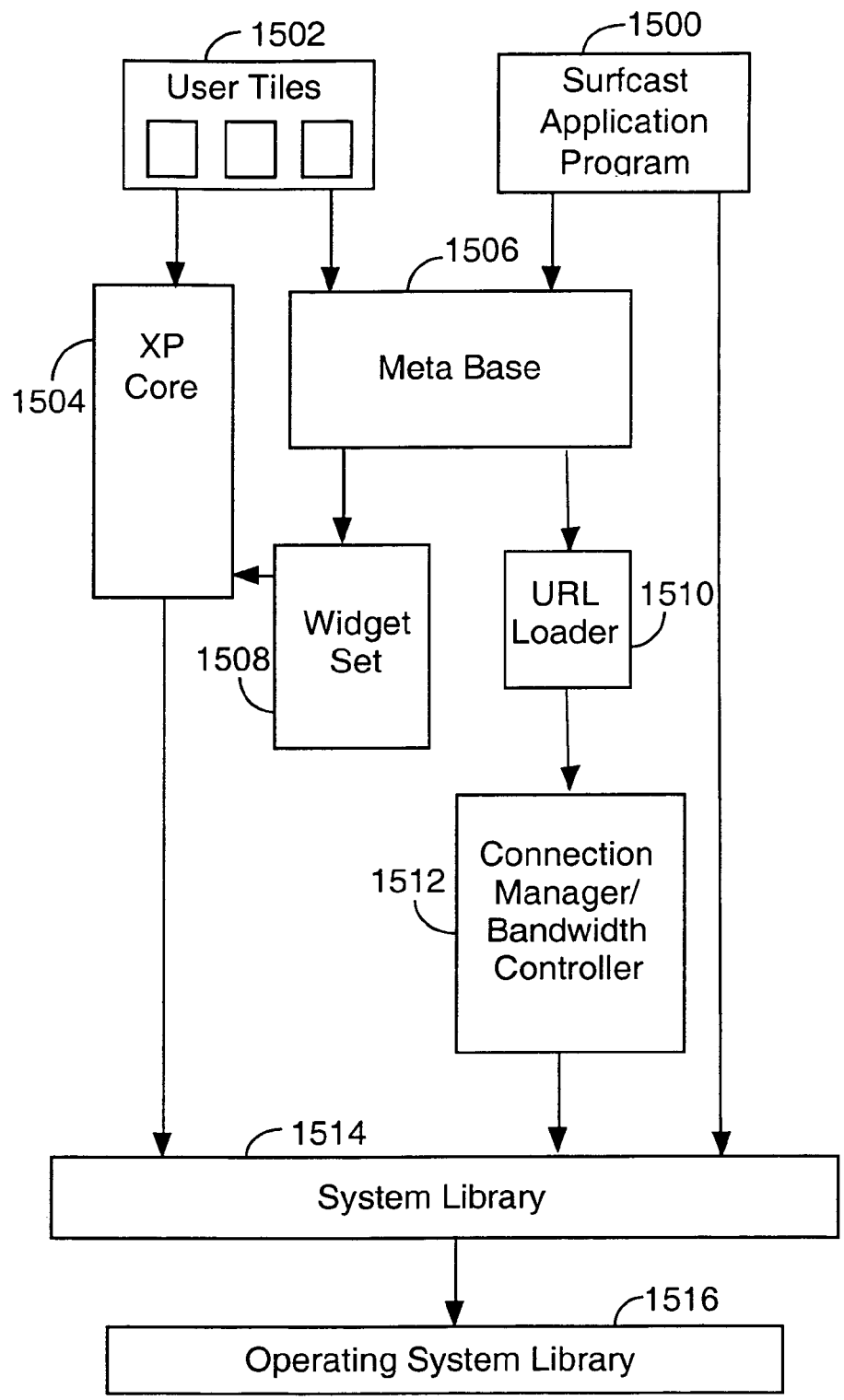
FIG. 15 shows an example of the architecture of the computer program in a preferred embodiment of the present invention.

The hierarchy of the software in a preferred embodiment of the present invention, the Surfcast System, is illustrated in FIG. 15. It is understood that the Surfcast System is merely an exemplary embodiment and that other software products can be developed that fulfill the functions of the present invention. It is further understood that the Surfcast System or other equivalent systems, may be distributed between a client and one or more servers and that all parts of it need not reside on a single device.

The Surfcast System software comprises a number of modules. In FIG. 15, an arrow connecting two modules means that one module uses an interface of the other. The arrow comes from the module invoking the interface towards the module whose interface is being invoked. An interface may simply be a function call between the two modules or, for example, a call to a dynamic linked library (DLL).

The Surfcast application program 1500 takes its underlying data from two sources, a metabase 1506 and a system library 1514 that preferably resides on the device on which the application program is running. For example, the application program 1500 may be required to call functions from the system library while it is running. Actual tiles that a user visualizes can be spawned from the metabase 1506.

Data structures for user tiles 1502 are obtained from the XP core 1504 which itself also utilizes components from the system library 1514. In a preferred embodiment there are different data structures for tiles of different priorities. The XP core is an abstraction layer for the operating system environment. Tiles that utilize components such as buttons take these components from the widget set 1508. A widget is a basic user interface element such as a button or a text input box. The metabase also uses an interface of the widget set 1508, and can therefore use functions within the widget set. The widget set requests functions from the XP core.

Objects in the metabase 1506 that retrieve content from remote sources such as world wide web pages utilize a connection manager and bandwidth controller 1512. A URL loader 1510 decides whether content should be obtained afresh by contacting the connection manager 1512, or from content previously stored in cache. Effectively, the URL loader manages the connection manager, and calls functions within it.

Underlying all of the Surfcast application program's operations are functions from the operating system library 1516 that is supplied with the device on which the application program is running.

Each of the objects shown in FIG. 15 is now described in further detail by reference to FIGS. 16-21.

Figure 16:
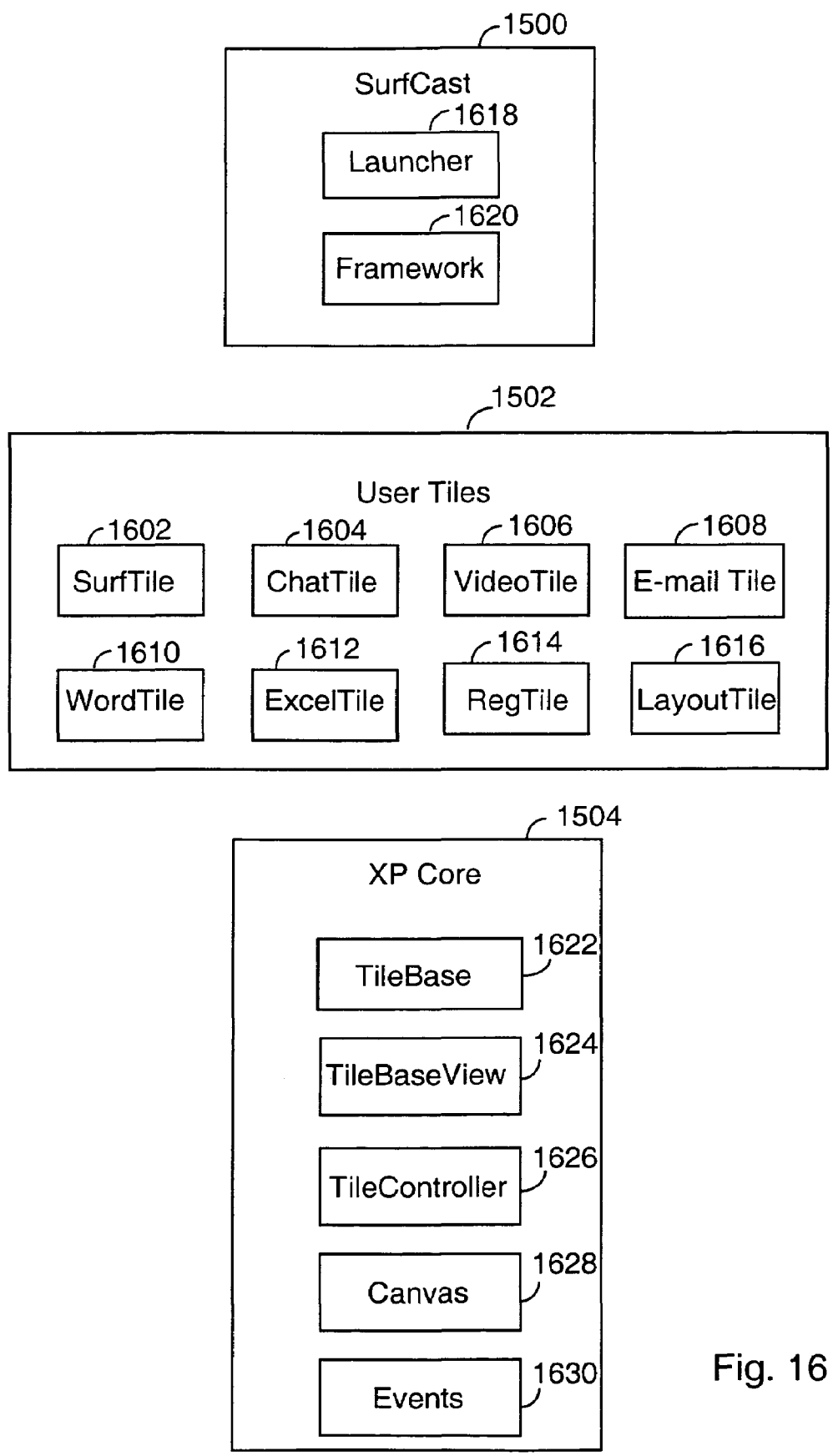
FIG. 16 shows the architecture of the application program and its components in a preferred embodiment of the present invention.

The Surfcast application program 1500, in FIG. 16, comprises a launcher 1618&and a framework 1620. The launcher opens the program from scratch whereas the framework is responsible for managing grids and tiles. The user interacts directly with the framework to set up a preferred arrangement of tiles on the display. In one embodiment, the framework initially contains a prescribed set of tiles. The framework controls communication between tiles, for example, in the case of conditional content.

Tiles 1502, FIG. 16, are the equivalent of an application in a conventional GUI system. They can be built in C++using the Surfcast tile builder application program interface (API) using XP core classes, or via a utility such as a custom tile editor or via a script file. Some predefined tiles are included with the basic Surfcast system including a web browser tile called a surftile 1602, tiles for contacts and communications such as a chat tile 1604 and an e-mail tile 1608. Media-player tiles such as a video tile 1606 are also supplied, as are tiles that interface to commonly used desktop programs. A word tile 1610 interfaces to a word processor; excel tile 1612 interfaces to a spreadsheet program. A general content viewer that can compose pieces of content clipped from a variety of sources, layout tile 1616, is also provided. Reg tile 1614 is a general purpose tile that permits a user to define his own tile type.

In a preferred embodiment, all tiles have a common base class, and each specialized type of tile has its own class that builds upon the base class. There are many ways in which specific tile classes can be derived from the common base class. In a preferred embodiment, tiles are categorized into a hierarchy. There may be a tile class specific to each level in the hierarchy. Functions for specific tile classes are readily apparent to one of skill in the art. Tiles may additionally be represented by markup language files and viewed within a web-browser environment.

The data classes in XP core 1504, FIG. 16, comprise base classes and utility classes with which tiles and widgets are built. In general, classes within the XP core describe how tiles can communicate with one another and with the overall application program framework 1620. In particular, XP core classes are generic and portable, thereby permitting cross-platform capability.

XP core classes include: tilebase 1622 for the generic class that underlies all tiles; tile base view 1624; tile controller 1626; canvas 1628; and event classes 1630 for event handling. A view is what a tile uses to draw itself. Tile base view 1624 is the base class for all views associated with a visual object. A controller processes events 1630, for example mouse moves, clicks, keyboard events and external events. Tile controller 1626 is the base class for controllers associated with a tile. A canvas 1628 is an area of screen on which to render some image, for example a tile.

Figure 17:
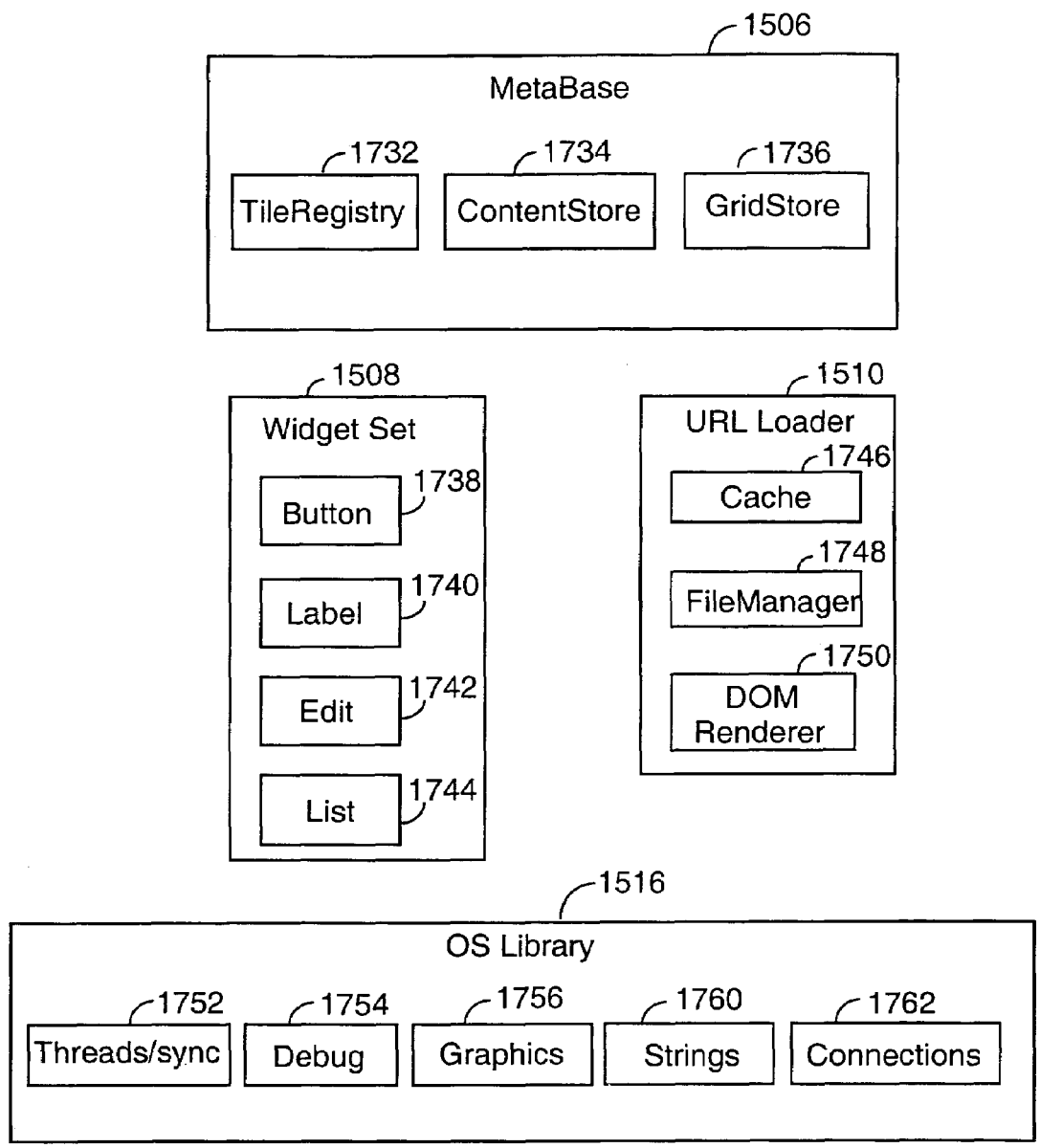
FIG. 17 shows the architecture of components of the computer program in a preferred embodiment of the present invention.

The metabase 1506, FIG. 17, is a local store for platform-specific implementations of the descriptions of tiles, grids and other objects. Tiles, grids and content are created, saved and restored via the metabase. The metabase contains tile type and content type registries such as tile registry 1732, and a local database of grids and content such as content store 1734 and grid store 1736. Unknown tile and content types can be obtained from remote servers. Tile types are abstracted so that if a grid contains a particular type of tile, for example an e-mail tile, the metabase provides whatever is appropriate for the device the application is running on. Items in the metabase are "persistent", that is they are not saved explicitly but are preserved from session to session.

The widget set 1508, FIG. 17, comprises a platform-specific set of visual components that tiles can use. Widget set contains the predefined widgets that are included with the system. It can be extended with new widgets. It includes such useful widgets as a button 1738, a label 1740, an edit widget 1742 that enables a user to enter text into an editable field and a list widget 1744 that enables a user to select from a set of options. Items within the widget set can be used with tile types such as text input tiles, web browser tiles, and a streaming video tile. The term widget can also include more complex objects such as a video player that can be inserted into a tile as easily as a button.

The URL loader 1510, FIG. 17, provides a mechanism for retrieving content. The URL loader 1510 interacts with connection manager 1512 for tiles which need to make a network connection. Tiles and the metabase ask for content for a given URL and the content manager will attempt to retrieve it. The metabase also contacts the connection manager through the URL loader to ascertain whether there is sufficient bandwidth for the transfer. In particular, the connection manager decides whether the URL loader should furnish tile content from the cache 1746, as would be the case if the content has been recently displayed and stored locally. Alternatively, if the content is not cached, the URL loader supervises loading of content from the location specified by the URL.

The URL loader 1510 also comprises a file manager 1748 for organizing the cached content. The URL loader additionally comprises a DOM (data object model) renderer 1750 that administers the parsing of pages in markup languages such as XML and HTML. The URL loader may also comprise an implementation of an API for XML rendering such as SAX. In an alternate embodiment, such an API may reside in the XP core module.

The system library 1514 comprises commonly used utilities within the application program, including, but not limited to, code for string manipulations, file handling and server communication. The system library module comprises generic code and can be compiled for any operating system.

The operating system library 1516, FIG. 17, comprises utilities that differ in their implementation from system to system but are needed for operation of the application program. For example, utilities that may be found in system library 1516 are those that provide support for threads and synchronization 1752, debugging tools 1754, graphics libraries 1756, further basic string manipulations 1760 and connections 1762. Additionally, not shown in FIG. 17, useful items in the operating system library include utilities that permit definitions of objects, sockets, input devices and hardware devices. Items in the operating system library are accessible through classes with documented public interfaces.

Figure 18:
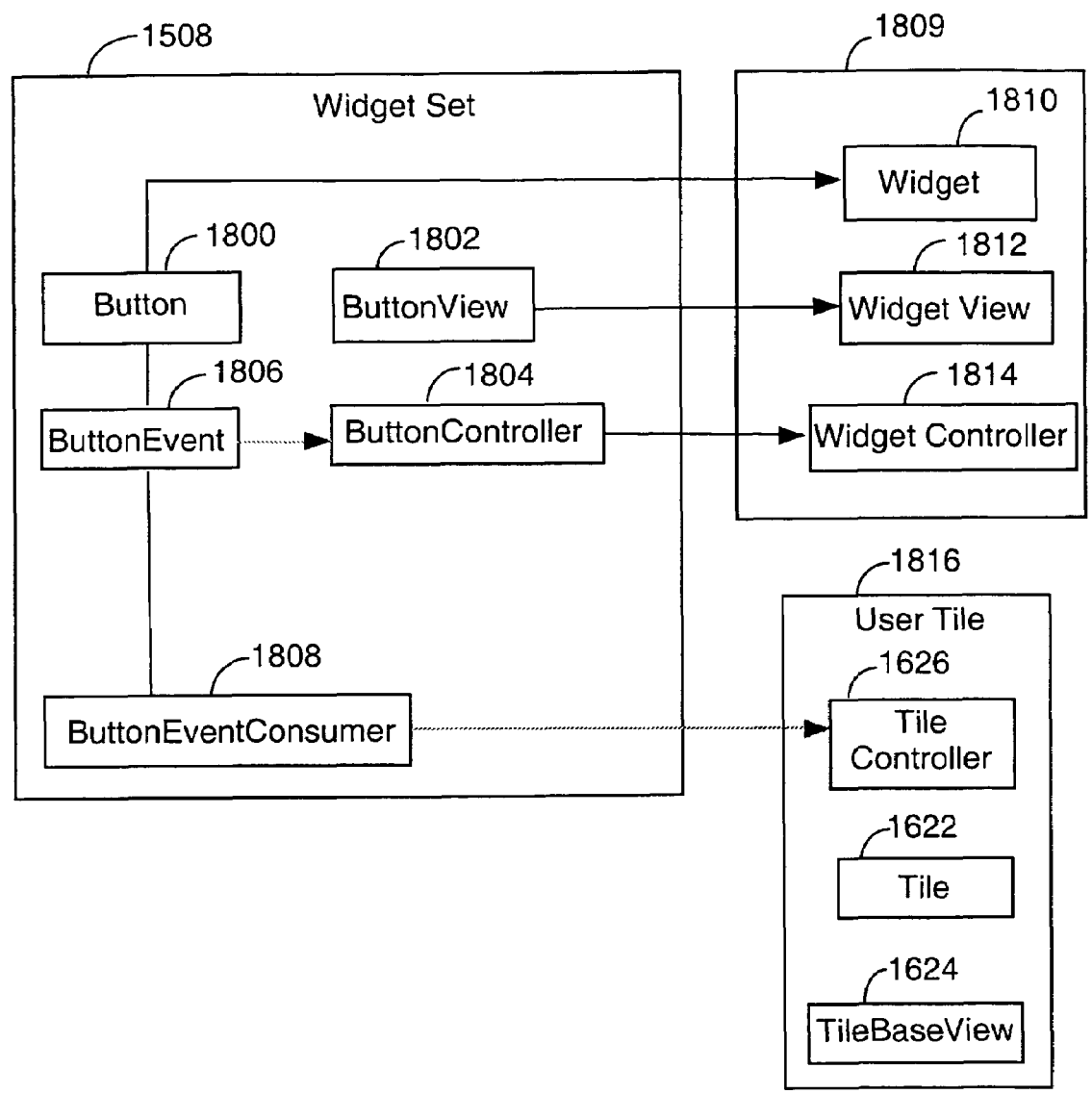
FIG. 18 shows an outline of the widget-set used in a preferred embodiment of the present invention.

The operation of the widget set 1508 is further described with respect to FIG. 18. As previously mentioned, the widget set contains widgets for various functions such as buttons, text labels, etc. Illustrated in FIG. 18 is a set of widgets for buttons.

FIG. 18 shows the class hierarchy for the button widget. In FIG. 18, a solid line with an arrow head indicates a relationship of inherency between two classes. Base classes for widgets are grouped together in box 1809. Widget class 1810 is a container for other classes. All widgets use the base class widget 1810 stored in the XP core module and further described later. Accordingly, button 1800 is a specific class inherited from widget 1810.

Widget view 1812 is a class, also stored in XP core, that defines the look and feel of the widget. Button view 1802 inherits from widget view and controls how a button draws itself.

In the scheme of FIG. 18, user tile 1816 comprises three objects, tile controller 1626, the base class tile 1622 and tile base view 1624, each of which is found in XP core and is further described later. Tile base view 1624 is responsible for drawing the tile and can employ one or more widgets.

A button is something that a user can click on. A button provides button events to a button event consumer. A button event consumer is also known as a client, i.e., clients that use buttons implement button event consumer 1808 to be notified of button events. For example, a button event consumer may be a "play" function in a video tile. The button event consumer interacts with a control structure tile controller 1626 associated with a user tile 1816 by telling the tile that the button has been activated. Button event consumer 1808 is itself a class that inherits from an event consumer class, described later.

Button controller 1804 controls how button events 1806 are processed, for example mouse and keyboard events. It inherits class structure from widget controller 1814 stored in XP core. Not all button events 1806 are recognized by the button controller 1804: for example, a particular key-stroke may have no effect on the state of the button.

Other widgets follow a similar pattern. They include: textedit, for inputting text; textlabel, for displaying text; .textspinner, for selecting from a choice of options; datewidget, for entering a date; list, for selecting from a choice of options; titlebar; and a toolbar.

Figure 19:
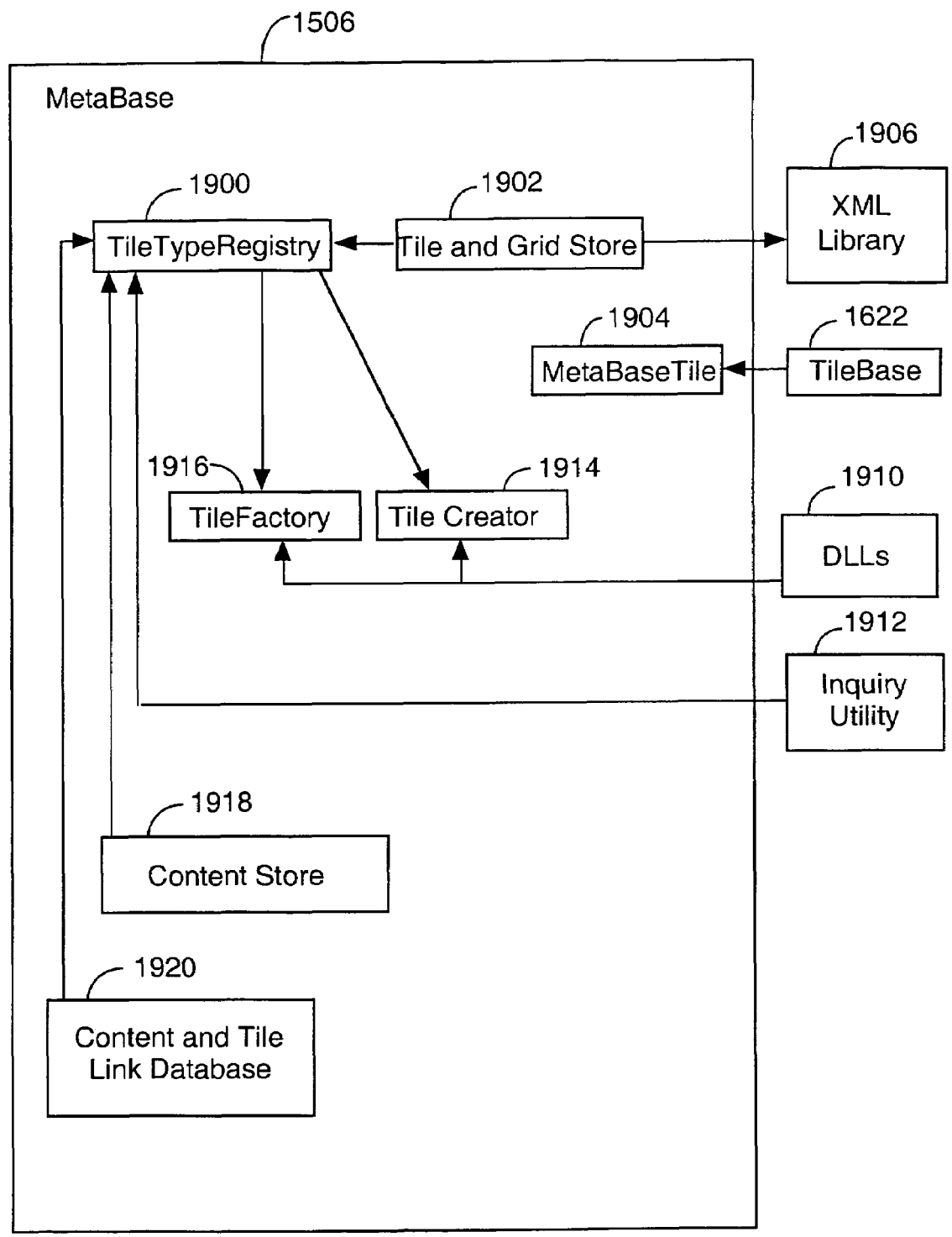
FIG. 19 shows an outline of the metabase according to a preferred embodiment of the present invention.

Metabase 1506 is further described with respect to FIG. 19. Arrows between the components in FIG. 19 denote interfaces. The metabase comprises a registry 1900 and store 1902 of tile and grid types, a content store 1918 and a content and tile link database 1920.

The tile type registry 1900 contains a list of tile and widget types along with information about how to create them and what they are called, as well as other information such as pointers to objects from which tiles are created. In a preferred embodiment, the list of tile types includes tiles in a hierarchy of categories. The tile and grid store 1902 contains a library of stored grids and tiles. Tiles can save themselves or be restored. In a preferred embodiment, grids are just special cases of tiles. Tiles from the tile library can be called and displayed on the screen by asking the registry to load tiles. The tile and grid store interfaces to an XML library 1906.

Tiles from the tile and grid store can also be saved outside the metabase in a library of markup language files, e.g., an XML library 1906.

Also in the metabase 1506 is metabase tile 1904 which utilizes tile base 1622 from the XP core module. All tiles inherit from this class.

DLLs can contain additional tiles and widgets that can be created by independent third parties. These can be implemented within the metabase through the tile factory 1916 and tile creator 1914, both of which interface to the tile type registry 1900. The tile factory 1916 contains the description and classes necessary for someone to register a new tile type. Tile creator 1914 is the code that does the tile creation at runtime. In general, independent creation of tiles is facilitated by supplying a tile toolkit to third parties.

Inquiry utility 1912 is an optional means for an outside user to interface to the metabase, for example to ascertain the class structures of stored tile classes.

Content store 1918 is a cache that contains content of tiles for the previous session. The content store 1918 follows a similar pattern to the tile type registry and the tile store. The content and tile link database 1920 is a database of information about how tiles and grids are related, and how content is related between them. Content tile link database 1920 copes with descriptions of relationships between tiles and also themes of content for related tiles. This database can also be used in the context of "knowledge management", i.e., those operations that monitor a user's activities and attempt to suggest further sources of content based on it. Both content store 1918 and the database 1920 interface with tile type registry 1900.

Figure 20:
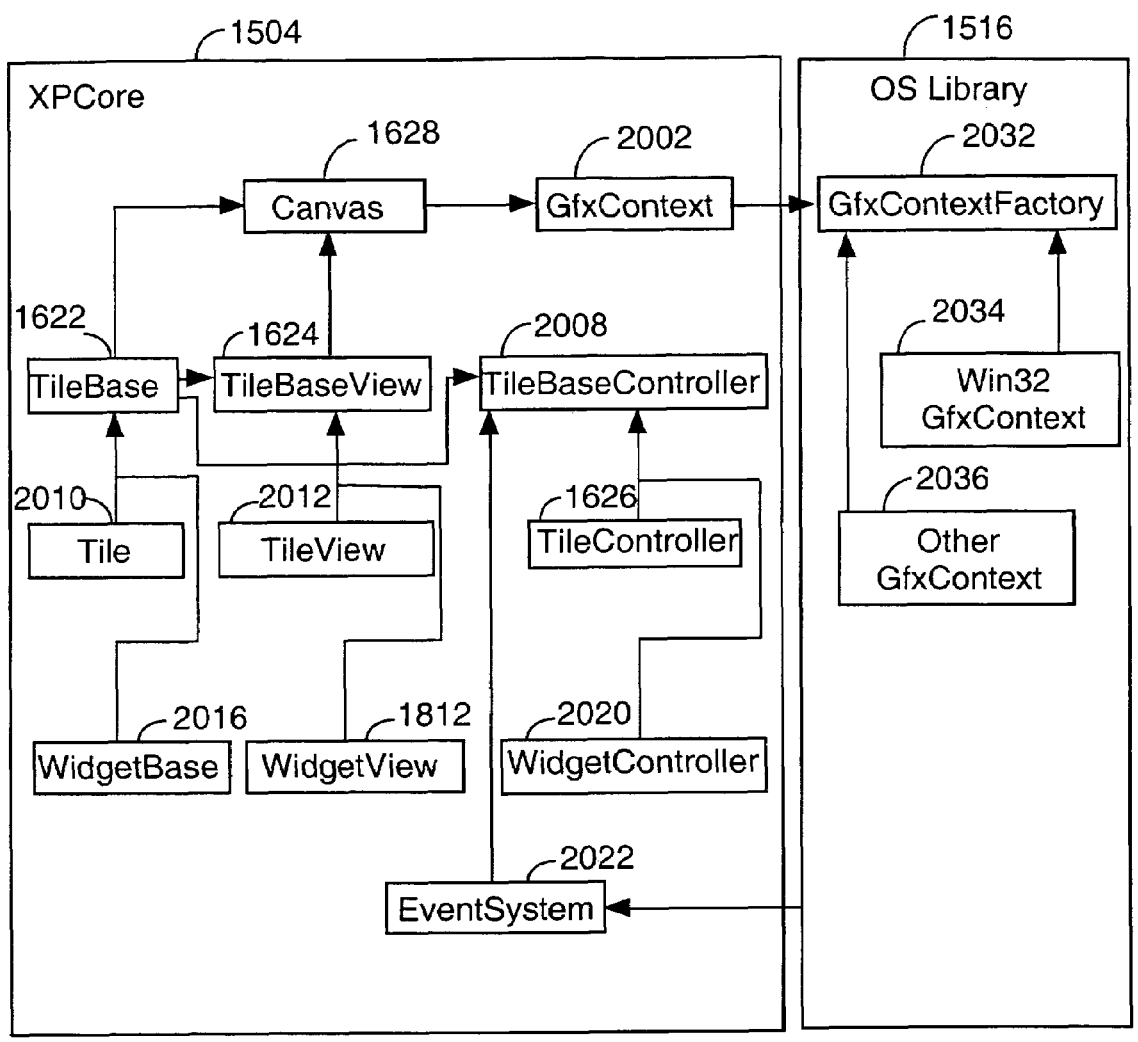
FIG. 20 shows an outline of the XP Core and its interaction with the operating system library in a preferred embodiment of the present invention.

FIG. 20 shows a further description of classes found in the XP core and their interaction with the operating system library 1516. As discussed below, some arrows between objects within XP core denote inheritance of classes.

Canvas 1628 describes an area of screen that can be drawn to. GfxContext 2002 is a set of graphics primitives, for example for line-drawing, colors and space filling. It is a generic version that encapsulates and abstracts operating system-specific features inherited from GfxContextFactory 2032 in the operating system library 1516. Win32 GfxContext 2034 is an example of a graphics context used with the Windows operating system. Other GfxContent 2036 includes alternative platform dependent graphics contexts.

The foundation classes are tile base 1622, tile base view 1624 and tile base controller 2008. Tile base 1622 is the base class for all visual objects such as tiles, widgets and grids. The tile class 2010, and widget base class 2016, inherit from tile base. Where tiles are in a hierarchy of categories, there may be several tile classes that inherit from tile base.

A widget effectively functions as a special kind of tile that can be placed inside a tile. Widget base 2016 is not meant to be instantiated on its own but is a foundation for the widget class 1810, FIG. 18, used by a generic widget.

Tile base view 1624 is the base class for all views associated with a visual object. A view is what a tile uses to draw itself. Inheriting from tile base view are tile view 2012, the base class for all views associated with tiles, and widget view 1812, the base class for all views associated with widgets. Tile base view and tile base also interface with canvas 1628.

Tile base controller 2008 is the base class for all controllers associated with a visual object. Inheriting from tile base controller are tile controller 1626, the base class for controllers associated with a tile, and widget controller 2020, the base class for all controllers associated with widgets. A controller processes all events. Tile base interfaces with both tile base view 1624 and tile base controller 2008. Tile base controller interfaces to event system 2022. Finally, event system 2022 also communicates between the operating system library 1516 and the tile base controller 2008.

Figure 21:
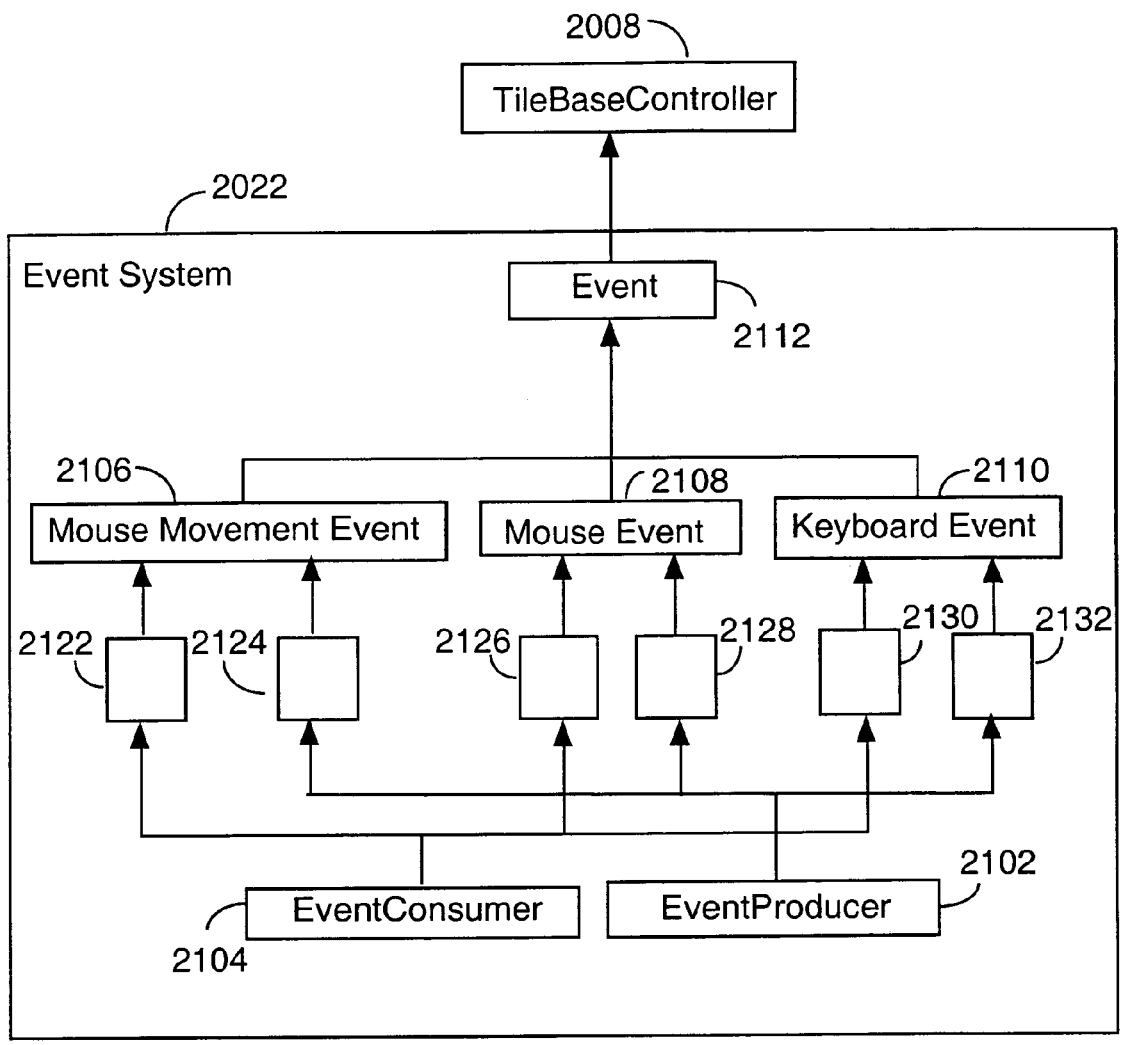
FIG. 21 shows an overview of the event system utilized in a preferred embodiment of the present invention.

Event system 2022 is further described with respect to FIG. 21. An event can be any one of a mouse movement event, another mouse event such as a mouse-click, or a keyboard event such as a keystroke. In FIG. 21, event 2112 is the base class. Other classes such as mouse movement event 2106, mouse event 2108 and keyboard event 2110 derive from the base class by inheritance. The event consumer 2104 is a class responsible for directing events to the controller. The event producer 2102 interprets system events into Surfcast events for an event consumer. The boxes 2122, 2124, 2126, 2128, 2130 and 2132 are multiplexers handling the case where multiple clients are affected by multiple types of events. An event is communicated to tile base controller 2008.

Managing Connections to More than one Datastream

When two or more tiles connect to sources of data available over a network, communication must be established in such a way that the rate at which updated data is transmitted to the grid can be controlled. In practice, for an embodiment of the application which resides on a user's computer, a flow control protocol such as TCP is required. In this way, each tile can communicate with the remote datastream to which it is linked and a determination can be made of available bandwidth at the time of data transfer. Alternatively, in a client-server mode, flow control is not necessary because communication with the server suffices, as is described below.

It is not practical to fire up a separate browser program from each tile that wishes to download data from a site on the world wide web. A web-browser is very greedy on memory and resources and the user would have little or no control over the respective rates at which data was downloaded from different sites.

Figure 22:
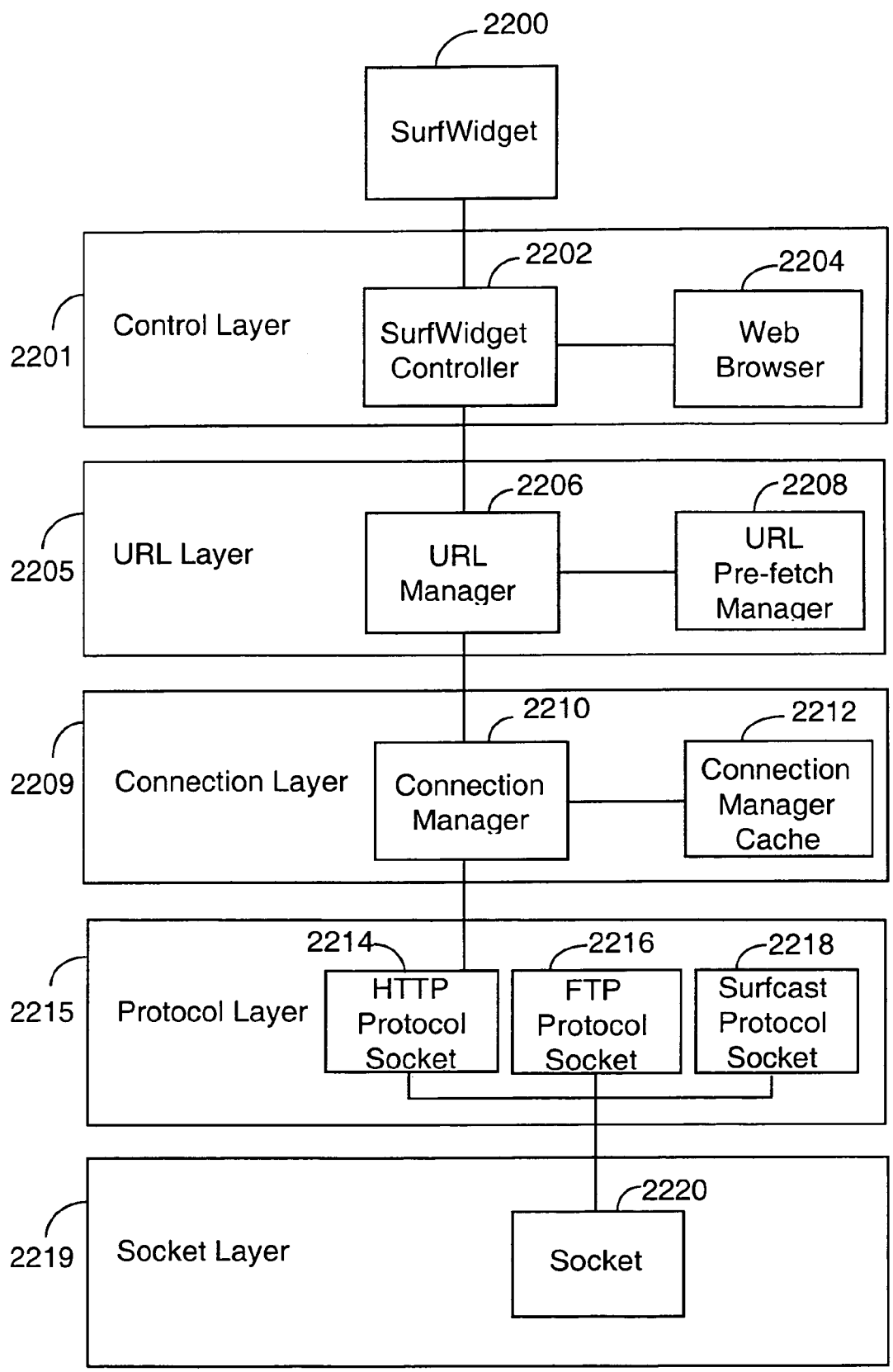
FIG. 22 shows an overview of the connection layers that are responsible for controlling the download of multiple web-pages from the world wide web.

Instead, in a preferred embodiment of the present invention, a hierarchy of layers manages the simultaneous connection and allocation of resources to different world wide web sites, as shown in FIG. 22. The layer structure applies to the way in which any given tile downloads content.

At the highest level there exists a widget, referred to as "SurfWidget" 2200, which is the basic browser control within the application program of the present invention. Ideally, this widget operates in conjunction with any commonly used world wide web browser. It is typically associated with a tile type such as surftile 1602.

The surf widget communicates with a surf widget controller 2202 in a control layer 2201. Also in the control layer is a web browser application program 2204. Examples of such a program include Microsoft's Internet Explorer and Netscape's Navigator software. The surf widget controller 2202 handles the interaction between the surf widget 2200 and the web-browser 2204. The surf widget controller also passes on requests from the browser to the URL Manager 2206 in the next layer, the URL layer 2205. The surf widget controller then pipes back the results to be rendered to surf widget. A typical example of this process in operation would be: a user clicks on a hyper-link in a web-page; the web-browser makes a request for that page to surf widget controller 2202; the request gets handed to the URL manager 2206; once the page is loaded, the URL manager 2206 notifies the surf widget controller, which in turn sends the information to the web-browser for rendering.

The responsibility for obtaining pages of content is that of the URL layer 2205. When a URL is requested, the URL manager 2206 issues a request for the page and any subsequent media to the connection manager 2210. The URL manager keeps track of the requested URL for future use, if it is requested again. The URL manager also queues up URL's that have been requested according to their focus, i.e., the tile that a user has currently selected and according to the respective priorities of the active tiles.

In a preferred embodiment, a pre-fetch utility such as URL pre-fetch manager 2208 can be implemented. It saves the user time if items can be pre-fetched instead of waiting for their download. Several strategies can be used to obtain pre-fetch items for the user. Using a history of a user's previous browsing habits, it is possible to predict what the user will probably want next. Another function of a pre-fetch utility is to periodically check the validity of items in the cache to make sure they are up to date. As would be familiar to one skilled in the art, some of the new HITP1.1 methods would prove very useful for this, namely the conditional gets. Another strategy is to start loading links from the page that a user is browsing, regardless of whether the user has selected the links. Although such an approach could be very wasteful of resources if there are a lot of links and very few are ultimately accessed and also because a lot of links tend to be advertisers, this approach could be effective in situations where very high capacity bandwidth exists.

The connection layer 2209 handles each individual request for download passed to it through the URL manager, regardless of whether it is an HTML page, a graphic or sound file. The connection manager 2210 understands the total bandwidth available for allocation, for example, whether the device is connected to a modem or a T-1 line. It will also manage the connection to the requested site and maintain its own cache. Before making a network request for an item, connection manager 2210 first checks its cache, the connection manager cache 2212. If the item is not in the cache, the connection manager then passes the request off to the HTTP protocol socket 2214 in the protocol layer 2215. The way in which HTTP protocols and caches work is familiar to one skilled in the art.

The protocol layer 2215 consists of a suite of different socket types, 2214, 2216 and 2218, intended to support different communication protocols, such as HTTP, FIP and also a client server protocol specific to the application program via the surfcast protocol socket 2218. Preferably protocols employed are able to recognize QoS tags in the headers of packets that are passed through the layer.

The socket layer 2219 comprises at least one socket 2220. The socket layer wraps up all the system implementation specifics for a given platform and allows generic socket types to be built on top. The socket keeps track of its bandwidth usage, which can then be queried at the connection layer. The socket layer then facilitates bandwidth management.

With all communications going through the same socket layer it is possible to easily collect data about a socket's bandwidth usage. If, at the connection layer, it is noticed that the total bandwidth allocation has been exceeded, it is a simple case of blocking further data transfer until such time as total bandwidth usage falls back under what has been allocated.

As a user switches focus from one tile to another, priorities can be dynamically re-allocated to ensure the fastest possible loading of the selected page. Such an allocation can take into account priorities that have been assigned to the tiles based on their content, as well as based on identifiers associated with the information such as quality of service tags. All other communications can then abide by the same rules, allowing for complete control.

The sequence of events and functions in a "dynamic bandwidth allocation" feature of the present invention are described as follows. The dynamic bandwidth allocation feature involves a URL loader, the connection manager 2210 and a bandwidth controller.

The tiles that need access to the network resource for downloading content from a URL, pass certain parameters to the URL loader which manages all such requests from the tiles. These parameters include the URL itself, the priority of the tile, the minimum bandwidth requirement if any, and the maximum bandwidth requirement, if any.

The URL loader detects the need for a connection to a network resource, as would be notified to it by the connection manager. In the case of dial-up connections, the connection manager is responsible for allocating the modem resource and making the dial-up. Once a connection is made and the network resource is available, the URL loader requests the bandwidth controller to start delivering the required content, taking into account the additional parameters for each request.

Figure 23:
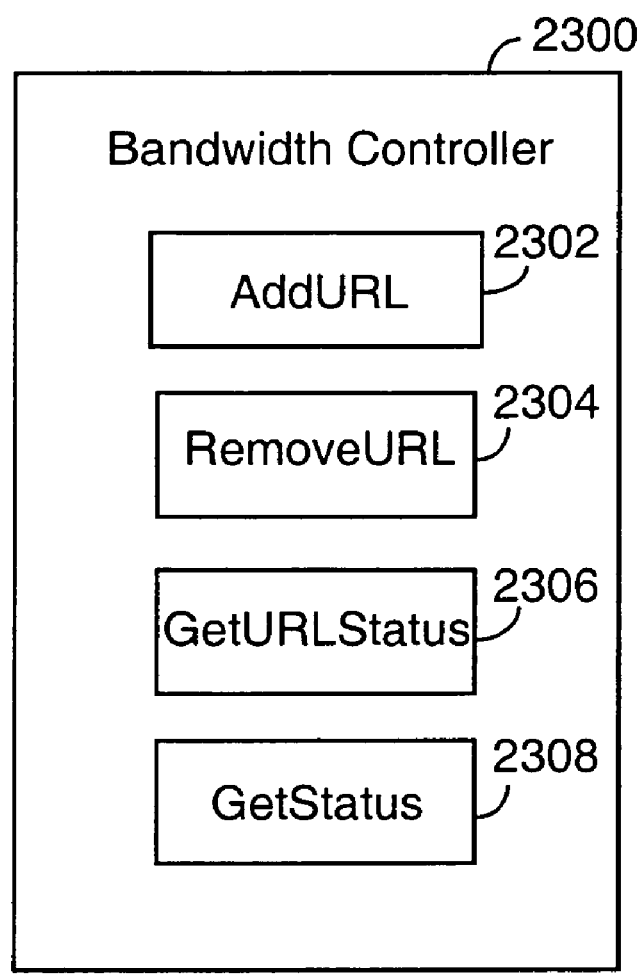
FIG. 23 shows a number of functions used by the bandwidth controller.

The bandwidth controller 2300 is an object that comprises a number of functions, as shown in FIG. 23. AddURL 2302 is a function used by the URL loader to add an additional connection request to those already considered. RemoveURL 2304 is used by URL loader when cancelling or aborting a request. GetURLStatus 2306 is used by URL loader to obtain a status report for a given request. GetStatus 2308 is used to obtain a general status report for the overall bandwidth. The bandwidth controller 2300 is additionally able to execute a main cycle loop over the outstanding UTRL requests for the purposes of managing the bandwidth among them. The following pseudocode describes steps within the main cycle loop, according to one embodiment of the present invention.

```
while ( uncompleted requests outstanding )
{
    calculate bandwidth obtained per request;
    check for need to postpone, stall or cancel lower priority requests;
    check for need to increase higher priority requests;
    detect completed requests and notify requestor;
    detect undeliverable requests and reissue or cancel if necessary;
    carry out other service and statistics functions, as required;
}
```

Each of these steps is explained, as follows. One or more of the steps may be performed in a different order from that presented above without departing from the scope of the present invention.

The step of calculating the bandwidth obtained per request utilizes a function that calculates obtained bandwidth for each of the managed requests, including requests that are stalled (or postponed) due to priority issues. This calculation takes place frequently because of the nature of the network. The bandwidth obtained can vary drastically even during the course of the individual network transaction, and therefore a priority based dynamic system must continuously accommodate such fluctuations. The result of calculating the bandwidth obtained is used both for feedback to users and for making decisions in the subsequent steps within the main cycle loop.

The step of checking for the need to postpone, stall or cancel lower priority requests is another precautionary mechanism to use for the purposes of adjusting the currently active connections. If outstanding requests are not achieving the desired minimum bandwidth, or an actual bandwidth in line with the priority of a given request is not achieved, bandwidth must be made available to the higher priority requests, by stalling, cancelling or postponing lower priority requests. A throttle feature implemented consistent with the layer nature of the stack can be applied wherein the frequency of issuing requests can be decreased. A complete cancellation of a request followed by reload from cache is usually the last resort.

The step of checking for the need to increase higher priority requests has the opposite effect. If applied, higher priority requests are increased by means of spawning additional simultaneous requests, or by increasing the throttle mentioned above.

Both the steps of checking the need to postpone and checking the need to increase a priority can provide feedback to the user in terms of their success or failure. Status parameters can additionally be collected and calculated.

The step of detecting completed requests and notifying the requester utilizes a function for handling successful completed requests. Conversely, the step of detecting undeliverable requests followed by reissuing or canceling the request if necessary is the mechanism for avoiding undeliverable requests, or retrying temporarily unavailable requests.

Other service and statistics functions may also be called, as may be necessary for supplying information to the layers above the connection layer.

Client-Server Interaction

It is envisaged that the methods of the present invention can be carried out using software that is distributed between a client and at least one server. At one extreme, as discussed hereinabove, the software runs entirely on a server. At another extreme, the client only hosts a browser that displays the grid and bandwidth allocation decisions are processed by a server. It is preferred that the server undertake more resource and bandwidth intensive tasks than the client.

Figure 24:
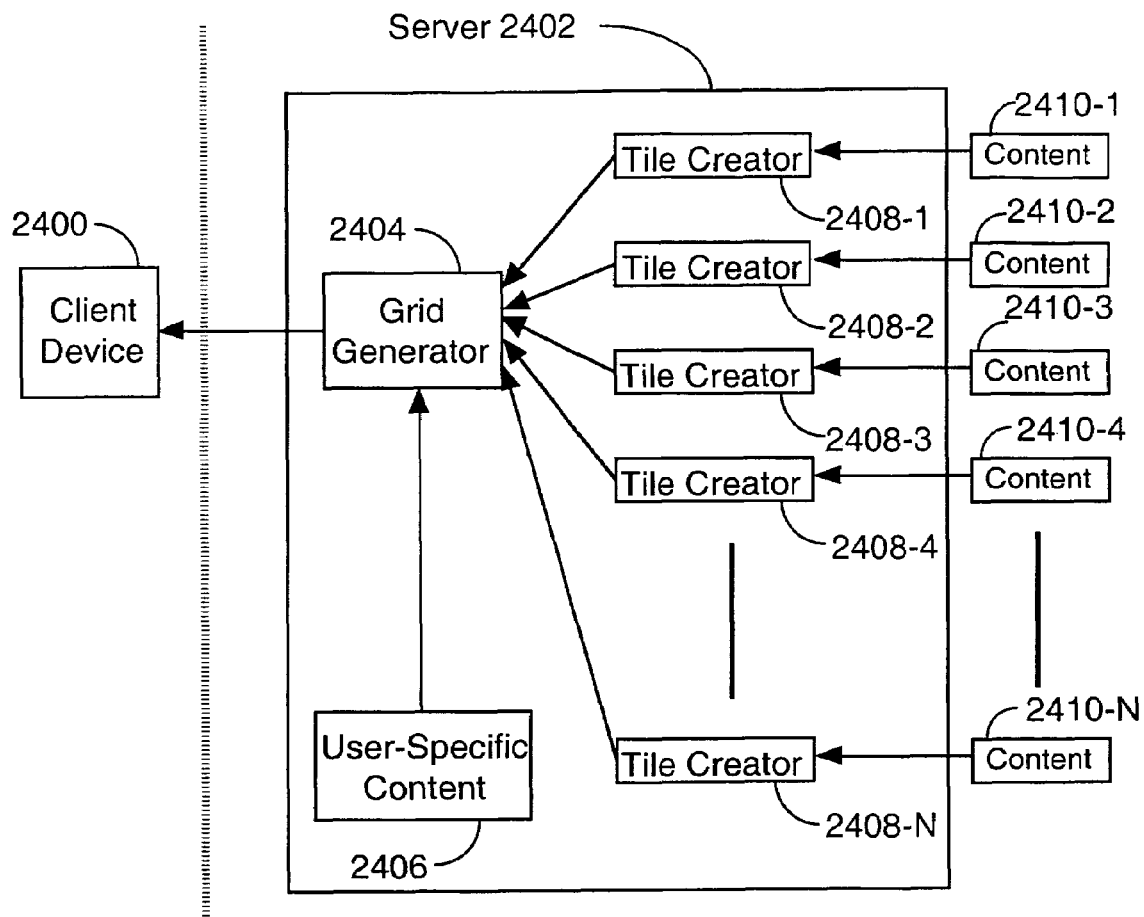
FIG. 24 is a schematic representation of the relationship between a server and a client device.

In one embodiment of the present invention, FIG. 24, the user at client device 2400 interacts with server software on a server 2402. The server stores locally a profile comprising user-specific content 2406 that can feed customized data to the user. For example, the user may store pre-defined grid configurations on the server. Additionally, passwords for specific web-sites can be stored along with the user's profile. A grid generator 2404 on the server creates a grid of tiles according to user-specified content. Each tile has been created on the server by producing an image from the location specified. For example, tile creator 2408-1 produces a tile from content 2410-1. Thus, when a user logs on to the server, for example through a conventional web-browser, a grid of tiles is downloaded to the user's system. Where an identifier is present in content such as 2410-1, tile creator 2408-1 can preferably recognize such an identifier and ascribe a priority to the tile that it creates based on that identifier. In an alternate embodiment, the tile creator automatically assigns a priority to the tile based on the type of the information content.

The client-server embodiment provides a number of advantages. For example, individual users and the devices they use may be differentiated. Therefore, the tile-content that the server delivers can be customized according to the rendering device of a particular user.

Figure 25:
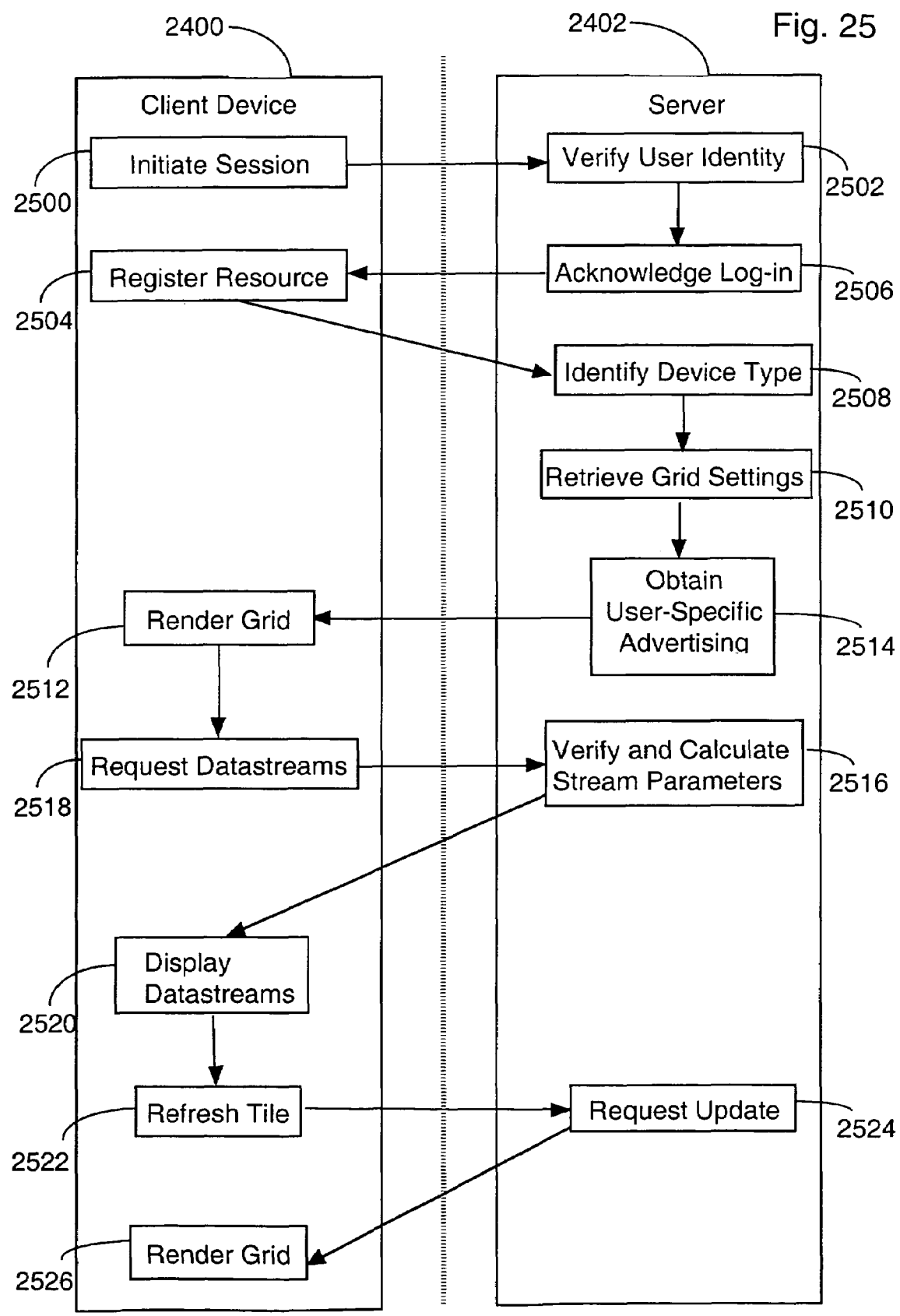
FIG. 25 shows a series of interactions between a client device and a server.

Turning next to FIG. 25, each time a user logs on to the server 2402, a "session" is initiated, step 2500. The server verifies the user's identity, step 2502 and acknowledges the log-in, step 2506. The client registers one or more resources, such as connection bandwidth, cost per transmission unit and properties of local playback device, step 2504. From this information, the server identifies the client device type, for example, set-top box or personal computer, step 2508. At step 2510, the server retrieves grid settings specific to the user, if appropriate. In preferred embodiments the server adjust grid settings according to the type of device, for example the size of its display. In preferred embodiments, the server adjusts grid settings according to the type of device, for example according to the size of its display. Details of a session, as defined by tile content and priorities can be held over from one session to another, both for the purposes of permitting a user to continue with ongoing work and in order to protect against the adverse consequences of abnormal disconnections. Additionally, targeted advertising and messaging can be delivered to subsets of users via the predetermined server.

Having rendered a grid, step 2512, and delivered it to the client device, the user can request sources of information such as datastreams, step 2518. Any number of datastreams can be requested at once, the corresponding stream request information which defines parameters for each stream is communicated to the server which verifies and calculates parameters for each stream, step 2516. In one embodiment the server allocates a priority to each stream according to the type of content, e.g., video, audio, static web-page content. In a preferred embodiment, the server uses an identifier associated with a datastream and allocates a priority based on that identifier. Such an identifier may be a quality of service tag.

Upon completion of these steps, the server 2402 knows the client characteristics and is able to distribute bandwidth available to the client among multiple content servers using for example a bandwidth controller 2300. In this example, if the client has an incoming bandwidth of say 56 Kbits/second, and is requesting datastreams from three sources with equal priority, then the server will respond for each request that a bandwidth of 56/3=18.7 Kbits/sec is available for each datastream.

The requested datastreams are displayed on the client device, step 2520 and, if the user changes the content of a tile or explicitly requests an update or refresh operation on the tile, step 2522, an update request is sent to the server, step 2524. Once the new content has been received, the grid is rendered anew, step 2526. Preferably the refresh rates of tiles on the client are allocated according to priorities associated with each tile.

Intensive operations on each displayed tile are also channeled through the predetermined server. For example, refresh operations on a tile generate a refresh request that is sent to the predetermined server. Similarly, requests to thumbnail a given image can be carried out, by request, on the predetermined server and the resulting compressed image transmitted to the user.

In the foregoing embodiment, the server component may reside locally on the client machine, in which case the server is known as the "Resource Manager", or it may be a remote server.

Figure 26:
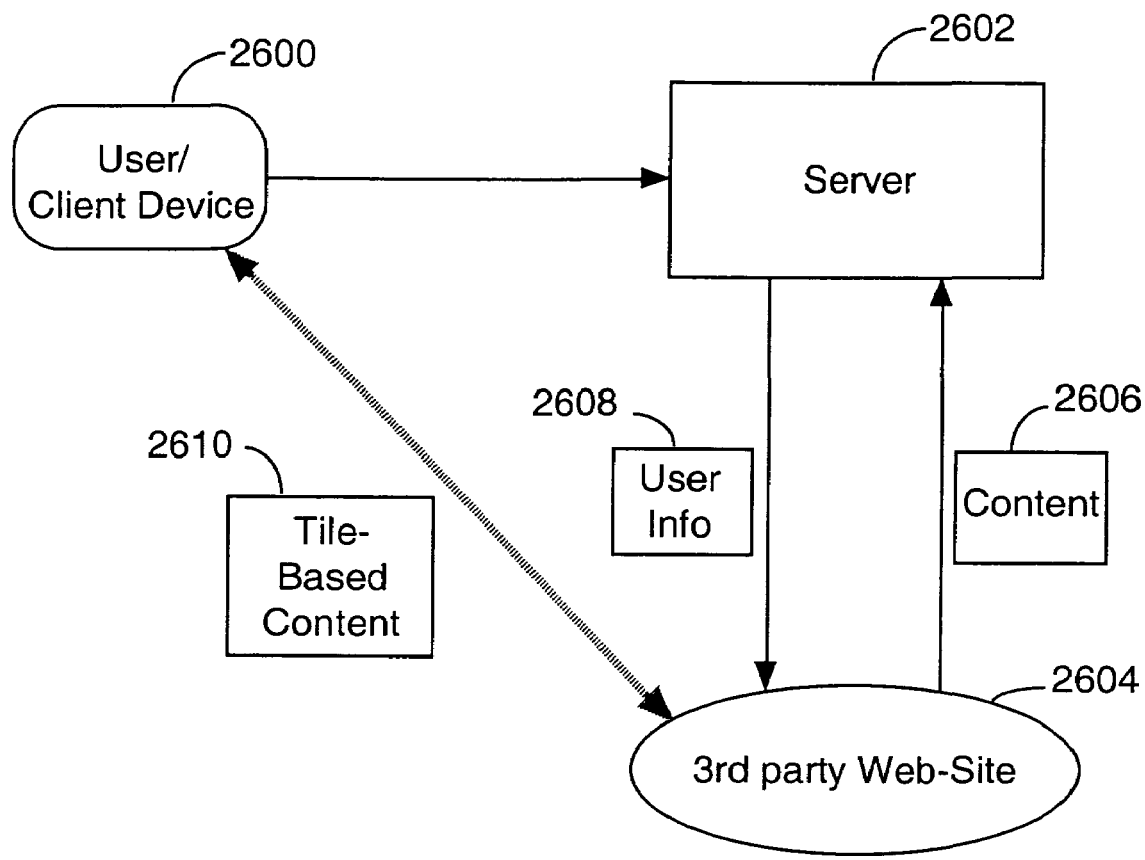
FIG. 26 shows how a user, a server and third party content providers communicate in accordance with an embodiment of the invention.

In a preferred embodiment of client server operation, shown in FIG. 26, aspects of a user's grid profile are transmitted to third parties so that the third parties may then communicate tile based content directly to the user. For example, a user's custom grid may contain a tile that points to a third party web-site 2604. Content 2606 from the $3^{rd}$ party web-site is typically transferred to the server for dissemination to the user. The server 2602 notifies the $3^{rd}$ party web-site that the user requires tiled data by, for example, transmitting user information 2608. The third party then permits the tile based content of its web-site to be transmitted directly to the user. The third party may attach an identifier to its information so that the server can assign a priority to the data.

The use of servers also allows for the latest versions of tiles to be downloaded and installed across all devices. Users are then able to share grids and tiles with other users. The server side technology provides users of all client devices, from desktop PC's to mobile telephones with a consistent experience.

The majority of the server side code is preferably written in Java, with C++ being used where appropriate. The methods and apparatus of the present invention are not dependent on the particular programming language employed. Inter-server communication also preferably utilizes XML to provide consistency with other aspects of the invention.

In a preferred embodiment, either Oracle 8i or SQL "Server 2000" are used to provide a relational database (RDB) functionality of the server. Both of these RDB's now provide direct SQL to XML transformations. Databases are preferably developed using the ANSI 92 SQL standard, which is usable by either of the RDB's.

Thin Client Technology

An object of the application program of the present invention is that it should operate on a variety of devices, including mobile telecommunications devices such as cellular phones, handheld web-browsers, palm pilots, personal digital assistants and other devices that can communicate by protocols such as wireless application protocol (WAP).

Accordingly, because most handheld or mobile devices do not have the same amount of local storage and processing power as desktop computers and set-top boxes, a special version of the application program of the present invention is envisaged for mobile devices. The special version embodies so-called 'thin client' technology in which a lot of the operations are performed by a server instead of the device itself.

An "n-tier" architecture is one that is designed generically for a multitude of platforms, for example PC's, PDA's WAP phones and UNIX systems. Accordingly, in order to maximize the use of mobile devices, the application program of the present invention employs an n-tier architecture allowing the majority of the processing to be carried out on the server with the results being sent to the device for rendering. This model allows for a reduced size system to be stored on mobile devices, with the system logic residing on remote servers. Preferably the server, which usually has a much wider bandwidth connection than does a given client, carries out the role of monitoring datastreams for updates, prior to transmitting refreshed content to the client.

The features that are moved from client to server will be dependent upon the device in question. For example, it is possible to provide the client with more features on a personal digital assistant such as a Palm pilot than on a WAP Phone.

When using thin client technology, it becomes especially important for the refresh rates of the tiles to be sensibly allocated according to a priority scheme. Accordingly the thin-client implementation preferably allows for the automatic allocation of tile priorities based on the type of information content being transmitted. The thin client implementation also preferably permits the allocation of tile priorities based on recognition of an identifier such as a "quality of service tag" associated with a source of information.

In order to provide a level of consistency between the devices and the servers, the markup language XML is preferably used to wrap the data that is being transmitted. As previously described, the system of the present invention uses a metabase to store information about the user's current grid and tile configurations. A synchronization procedure allows the metabase to be stored on a server and queried by any device. In this way it is possible to provide consistent grid and tile implementations independent of the device and its location. Such an embodiment would permit a variant of "peer to peer" communication.

Figure 27:
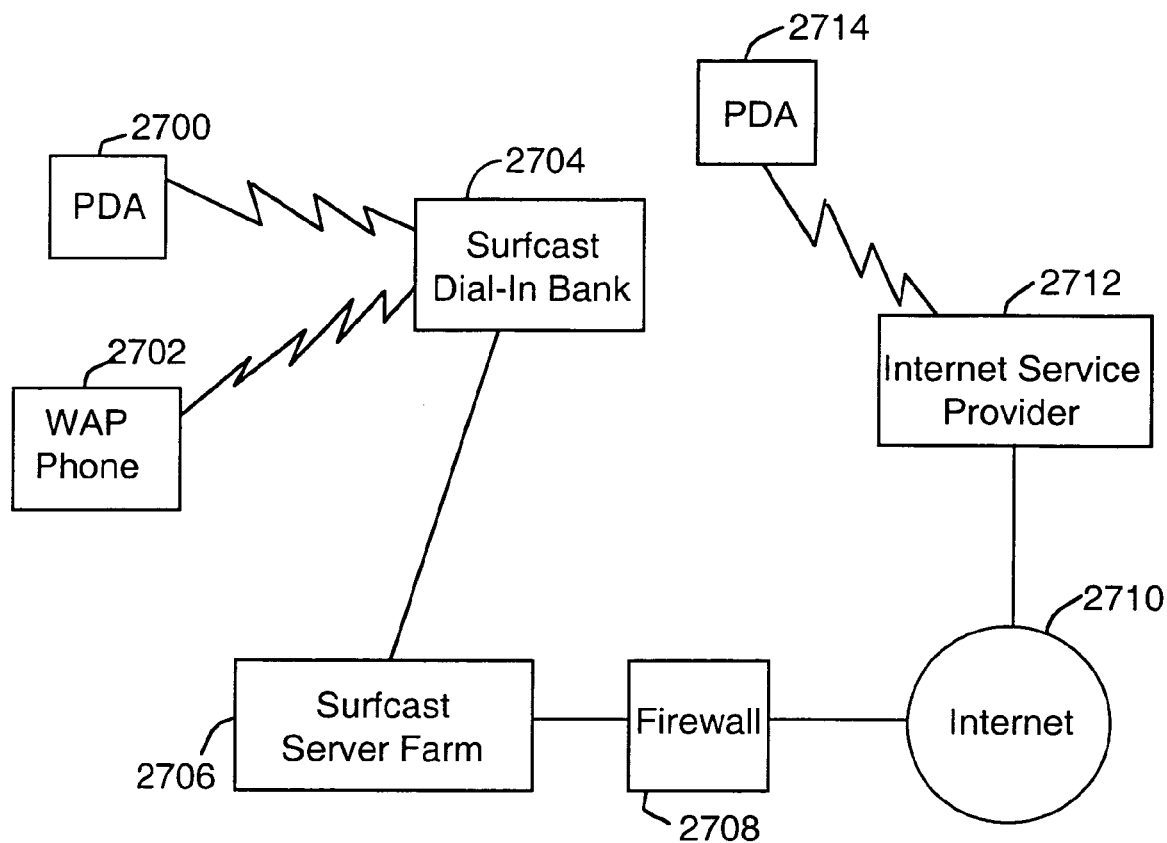
FIG. 27 shows an embodiment in which the application program communicates with one or more wireless devices.

FIG. 27 provides an example of the way in which wireless devices can interact with a server. A personal digital assistant (PDA) 2700 or a WAP phone 2702 communicates in a wireless manner with a dial-in bank 2704. The dial-in bank communicates data to a server farm 2706 which is connected to the internet 2710, optionally through a firewall 2708. Alternatively, another personal digital assistant such as 2714 can communicate with an internet service provider such as 2712, also connected to the internet 2710. The server farm 2706 is able to provide content directly to a PDA such as 2700 or indirectly, over the internet, to a PDA such as 2714.

What is claimed is:

1. A method executed by a processor under the control of a program, said method comprising:

partitioning a display into an array of tiles wherein information from a first source is displayed on a first tile in said array of tiles and information from a second source is displayed on a second tile in said array of tiles;

assigning a first refresh rate to said first tile and a second refresh rate to said second tile, wherein information from at least one of said first source and said second source contains an identifier that is used in said assigning;

updating information from said first source presented to said first tile in accordance with said first refresh rate; and updating information from said second source presented to said second tile in accordance with said second refresh rate, wherein said partitioning includes arranging said array of tiles into a non-overlapping configuration wherein at least one of said tiles of said array of tiles has a different size and shape from another of said tiles of said array of tiles.

2. The method of claim 1, wherein each tile has a size that is an exact multiple of a unit tile size.

3. An electronic readable memory to direct a device, comprising:

a first set of instructions to control simultaneous communication with a plurality of information sources;

a second set of instructions to partition a display unit of the device into an array of tiles, wherein said instructions to partition include instructions for arranging said array of tiles into a non-overlapping configuration wherein at least one of said tiles of said array of tiles has a different size and shape from another of said tiles of said array of tiles;

a third set of instructions to associate a first information source of said plurality of information sources with a first tile of said array of tiles and a second information source of said plurality of information sources with a second tile of said array of tiles, such that information from sail first source is displayed on said first tile and information from said second source is displayed on said second tile, and wherein information from at least one of said first source and said second source contains an identifier;

a fourth set of instructions to retrieve information from said first information source in accordance with a first retrieval rate and to retrieve information from said second information source in accordance with a second retrieval rate wherein at least one of said first and second retrieval rates is allocated based upon said identifier; and a fifth set of instructions to present information to said first tile in accordance with said first retrieval rate and present information to said second tile in accordance with said second retrieval rate.

4. The electronic readable memory of claim 3, wherein the second set of instructions further includes instructions for arranging said array of tiles into a non-overlapping configuration such that each tile has a size that is an exact multiple of a unit tile size.

5. A system for facilitating the organization and management of multiple data sources, the system comprising:

a device that includes a processor configured to execute instructions;

a memory connected to said processor to store at least one program that includes a graphical user interface; and an input device, wherein said processor executes instructions to:

control simultaneous communication with a plurality of information sources;

partition a display into an array of tiles, wherein said instructions to partition include instructions for arranging said array of tiles into a non-overlapping configuration wherein at least one of said tiles of said array of tiles has a different size and shape from another of said tiles of said array of tiles;

associate a first information source of said plurality of information sources with a first tile of said array of tiles and a second information source of said plurality of information sources with a second tile of said array of tiles, such that information from said first information source is displayed on said first tile and information from said second information source is displayed on said second tile, wherein information from at least one of said first source and said second source contains an identifier;

retrieve information from said first information source in accordance with a first retrieval rate and retrieve information from said second information source in accordance with a second retrieval rate wherein said first and second retrieval rates are allocated based upon said identifier; and present information to said first tile in accordance with said first retrieval rate and present information to said second tile in accordance with said second retrieval rate.

6. The system of claim 3, wherein the instructions to partition a display into an array of tiles further include instructions for arranging said array of tiles into a non-overlapping configuration such that each tile has a size that is an exact multiple of a unit tile size.

* * * * *